(12) United States Patent
Stofko, Jr. et al.

(10) Patent No.: US 8,420,069 B2
(45) Date of Patent: Apr. 16, 2013

(54) ANTIMICROBIAL AND ANTIFOULING POLYMERIC MATERIALS

(75) Inventors: John J. Stofko, Jr., St. Paul, MN (US); Jeremy M. Yarwood, Mablewood, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 171 days.

(21) Appl. No.: 13/120,293

(22) PCT Filed: Aug. 25, 2009

(86) PCT No.: PCT/US2009/054845
§ 371 (c)(1),
(2), (4) Date: Mar. 22, 2011

(87) PCT Pub. No.: WO2010/036465
PCT Pub. Date: Apr. 1, 2010

(65) Prior Publication Data
US 2011/0171158 A1    Jul. 14, 2011

Related U.S. Application Data

(60) Provisional application No. 61/100,394, filed on Sep. 26, 2008.

(51) Int. Cl.
*A61K 31/00* (2006.01)
*A61K 31/14* (2006.01)
*C08F 8/00* (2006.01)

(52) U.S. Cl.
USPC .......................... 424/78.3; 525/101; 514/642

(58) Field of Classification Search .......................... None
See application file for complete search history.

(56) References Cited

U.S. PATENT DOCUMENTS

| | | |
|---|---|---|
| 3,574,791 A | 4/1971 | Sherman |
| 3,728,151 A | 4/1973 | Sherman |
| 3,787,351 A | 1/1974 | Olson |
| 3,816,167 A | 6/1974 | Schultz |
| 3,920,614 A | 11/1975 | Kirimoto |
| 3,950,298 A | 4/1976 | McCown |
| 4,046,944 A | 9/1977 | Mueller |
| 4,557,837 A | 12/1985 | Clark, III |
| 4,624,889 A | 11/1986 | Bries |
| 4,668,726 A | 5/1987 | Howells |
| 4,681,790 A | 7/1987 | Fong |
| 4,795,793 A | 1/1989 | Amimoto |
| 4,859,754 A | 8/1989 | Maekawa |
| 5,075,400 A | 12/1991 | Andrade |
| 5,134,198 A | 7/1992 | Stofko, Jr. |
| 5,219,928 A | 6/1993 | Stofko, Jr. |
| 5,350,795 A | 9/1994 | Smith |
| 5,352,736 A | 10/1994 | Stofko, Jr. |
| 5,374,501 A | 12/1994 | Holmes |
| 5,569,732 A | 10/1996 | Nohr |
| 5,585,407 A | 12/1996 | Patel |
| 5,712,027 A | 1/1998 | Ali |
| 5,879,623 A | 3/1999 | Glover |
| 5,958,116 A | 9/1999 | Kishihara |
| 5,998,549 A | 12/1999 | Milbourn |
| 6,004,438 A | 12/1999 | Woodson |
| 6,037,429 A | 3/2000 | Linert |
| 6,048,953 A | 4/2000 | Kawashima |
| 6,231,929 B1 | 5/2001 | Milbourn |
| 6,303,190 B1 | 10/2001 | Linert |
| 6,353,051 B1 | 3/2002 | Huang |
| 6,403,113 B1 | 6/2002 | Corzani |
| 6,632,872 B1 | 10/2003 | Pellerite |
| 7,005,125 B2 | 2/2006 | Ulmer |
| 7,151,139 B2 | 12/2006 | Tiller |
| 2005/0003163 A1 | 1/2005 | Krishnan |
| 2005/0058619 A1 | 3/2005 | Reiners |
| 2006/0063871 A1 | 3/2006 | Taylor |
| 2008/0075960 A1* | 3/2008 | Pocius et al. ................. 428/446 |
| 2008/0279809 A1 | 11/2008 | Hackbarth |
| 2010/0022662 A1* | 1/2010 | Gobelt et al. .............. 514/772.3 |

FOREIGN PATENT DOCUMENTS

| | | |
|---|---|---|
| DE | 213074 | 8/1984 |
| EP | 0234601 | 9/1987 |
| JP | 11080273 | 3/1999 |
| JP | 2000/256612 | 9/2000 |
| WO | WO 96/16630 | 6/1996 |
| WO | WO 97/03135 | 1/1997 |
| WO | WO 2005/049757 | 6/2005 |
| WO | WO 2007/033736 | 3/2007 |

OTHER PUBLICATIONS

Costerton, "Bacterial Biofilms: A Common Cause of Persistent Infections", Science, May 21, 1999, vol. 284, pp. 1318-1322.
Gabriel, "Electrografting of Poly(ethylene glycol) Acrylate: A One-Step Strategy for the Synthesis of Protein-Repellent Surfaces", Angew. Chem. Int. Ed., 2005, vol. 44, pp. 5505-5509.
Jeon, "The Steric Repulsion Properties of Polyethylene Oxide", Bull. Korean Chem. Soc., 1992, vol. 13, No. 3, pp. 245-248.
Kenawy, "The Chemistry and Applications of Antimicrobial Polymers: A State-of-the-Art Review", Biomacromolecules, May 2007, vol. 8, No. 5, pp. 1359-1384.
Kingshott, "Covalent Attachment of Poly(ethylene glycol) to Surfaces, Critical for Reducing Bacterial Adhesion", Langmuir, 2003, vol. 19, No. 17, pp. 6912-6921.
Krishnan, "Comparison of the Fouling Release Properties of Hydrophobic Fluorinated and Hydrophilic PEGylated Block Copolymer Surfaces: Attachment Strength of the Diatom *Navicula* and the Green Alga *Ulva*", Biomacromolecules, 2006, vol. 7, No. 5, pp. 1449-1462.
Lee, "Surface properties of copolymers of alkyl methacrylates with methoxy (polyethylene oxide) methacrylates and their application as protein-resistant coatings", Biomaterials, Sep. 1990, vol. 11, pp. 455-464.

(Continued)

*Primary Examiner* — Brian Gulledge
(74) *Attorney, Agent, or Firm* — Jean A. Lown

(57) ABSTRACT

A polymeric material, methods of making the polymeric material, articles that include the polymeric material, and compositions that contain the polymeric material are provided. The polymeric material has a plurality of different pendant groups that include a first pendant group containing a —COOH group or a salt thereof, a second pendant group containing a poly(alkylene oxide) group, a third pendant group containing a silicon-containing group, and a fourth pendant group containing a quaternary amino group. The polymeric material can be used, for example, to provide coatings that can be antifouling, antimicrobial, or both.

14 Claims, No Drawings

OTHER PUBLICATIONS

Lee, "Blood Compatibility of Polyethylene Oxide Surfaces", Prog. Polym. Sci., 1995, vol. 20, pp. 1043-1079.

Nnebe, "Direct force measurement of the stability of poly(ethylene glycol)-polyethylenimine graft films", J. of Colloid and Interface Science, 2004, vol. 276, pp. 306-316.

Razatos, "Force Measurements between Bacteria and Poly(ethylene glycol)-Coated Surfaces", Langmuir, 2000, vol. 16, No. 24, pp. 9155-9158.

Roosjen, "Inhibition of adhesion of yeasts and bacteria by poly(ethylene oxide)-brushes on glass in a parallel plate flow chamber", Microbiology, 2003, vol. 149, pp. 3239-3246.

Roosjen, "Microbial Adhesion to Poly(ethylene oxide) Brushes: Influence of Polymer Chain Length and Temperature", Langmuir, 2004, vol. 20, No. 25, pp. 10949-10955.

Roosjen, "Influence of shear on microbial adhesion to PEO-brushes and glass by convective-diffusion and sedimentation in a parallel plate flow chamber", Colloids and Surfaces B: Biointerfaces, 2005, vol. 46, pp. 1-6.

Roosjen, "Stability and Effectiveness against Bacterial Adhesion of Poly(ethylene oxide) Coatings in Biological Fluids", Journal of Biomedical Materials Research Part B: Applied Biomaterials, May 2005, vol. 73B, No. 2, pp. 347-354.

Wei, "Stainless steel modified with poly(ethylene glycol) can prevent protein adsorption but not bacterial adhesion", Colloids and Surfaces B: Biointerfaces, 2003, vol. 32, pp. 275-291.

Wei, "Easy Preparation of Crosslinked Polymer Films from Polyoxyalkylene Diamine and Poly(styrene-maleic anhydride) for Electrostatic Dissipation", Journal of Applied Polymer Science, Jan. 15, 2007, vol. 103, No. 2, pp. 716-723.

International Search Report for PCT/US2009/054845, 6 pages.

* cited by examiner

ANTIMICROBIAL AND ANTIFOULING POLYMERIC MATERIALS

CROSS REFERENCE TO RELATED APPLICATIONS

This application is a national stage filing under 35 U.S.C. 371 of PCT/US2009/054845, filed Aug. 25, 2009, which claims priority to Provisional Application No. 61/100,394 filed Sep. 26, 2008, the disclosure of which is incorporated by reference in its/their entirety herein.

TECHNICAL FIELD

Polymeric materials with antimicrobial characteristics and coatings that include these polymeric materials are described.

BACKGROUND

Almost any surface can be susceptible to bacterial colonization. Bacteria can attach to surfaces either by non-specific mechanisms such as hydrophobic interactions or by specific mechanisms such as ligand-receptor interactions. As the bacteria grow and divide, they often surround themselves with a matrix that allows the influx of nutrients and that provides protection from agents harmful to their viability. The matrix (i.e., glycocalyx) includes polysaccharides as well as other substances such as proteins, minerals, and nucleic acids. The glycocalyx together with the included bacteria form a structure referred to as a biofilm. Many of the microorganisms in our environment exist as biofilms. Bacteria that exist in a biofilm are usually much more difficult to kill than planktonic, or free-living, bacteria. Much higher levels of an antimicrobial agent may be needed or the antimicrobial agent may need to be applied for a longer period of time to kill bacteria in a biofilm.

Surface contamination caused by disease causing bacteria in the home, workplace, or other public spaces can have significant human and economic impact. Bacterial biofilms can be involved in many diseases such as cystic fibrosis, Legionnaire's disease, dental caries, necrotizing fasciitis, and implanted medical device related infections. Nosocomial infections that affect both patients and medical staff in hospitals often require additional medical treatments that result in higher medical costs. In the food processing industry, contamination from fouled surfaces can cause food spoilage and pose a serious public health risk. In industry and civil services, biofilm growth in manufacturing equipment, piping, filters, and storage containers can result in ruined product and costly cleaning procedures. The fouling of marine vessels and other underwater surfaces may be initiated by the formation of a biofilm that attracts the organisms that populate these surfaces resulting in costly removal procedures.

Various biocidal materials are known. A biocidal material can be coated on a surface to provide an antimicrobial coating. In some instances, the biocidal material can be depleted from the coating over time through processes such as diffusion or extraction. In other instances, the biocidal material remains on the surface but the surface becomes contaminated with dead microbes or other insoluble contaminants.

SUMMARY

A polymeric material, a method of making the polymeric material, an article that includes the polymeric material, and a composition that contains the polymeric material are provided. The polymeric material has a plurality of different pendant groups and can be used, for example, to provide coatings. These coatings can be antifouling, antimicrobial, or both.

In a first aspect, a polymeric material is provided that includes a plurality of pendant groups including (1) a first pendant group containing a —COOH group or a salt thereof; (2) a second pendant group containing a poly(alkylene oxide) group; (3) a third pendant group having a silicon-containing group; and (4) a fourth pendant group containing a quaternary amino group.

In a second aspect, a polymeric material is provided that contains (a) at least one divalent unit of Formula (I) or a salt thereof;

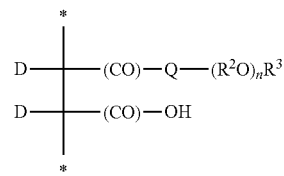

(b) at least one divalent unit of Formula (II) or a salt thereof; and

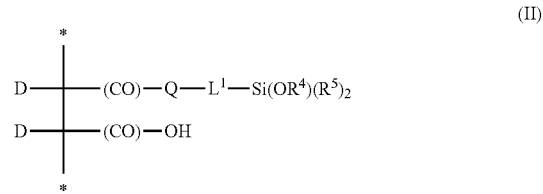

(c) at least one divalent unit of Formula (III) or salt thereof.

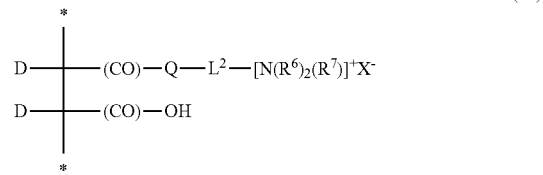

In these formulas, each D is independently hydrogen or an alkyl. Each Q is independently oxy or —NR$^1$— where R$^1$ is selected from a hydrogen, alkyl, aryl, or aralkyl. Each R$^2$ is independently an alkylene and R$^3$ is an alkyl. Group R$^4$ is independently hydrogen, an alkyl, or a part of a silicone. Each R$^5$ is independently a hydroxyl, alkoxy, alkyl, perfluoralkyl, aryl, aralkyl, or part of a silicone. Each R$^6$ is independently an alkyl, aryl, or aralkyl and R$^7$ is an alkyl. The group L$^1$ is a first linking group that contains an alkylene or heteroalkylene. Similarly, the group L$^2$ is a second linking group that contains an alkylene or heteroalkylene. The variable n is an integer greater than 1. The group X$^-$ is an anion.

In a third aspect, a method of preparing a polymeric material is provided. The method includes providing a solution that contains a polymeric precursor having a plurality of anhydride groups. The method further includes forming a poly(alkylene oxide)-containing pendant group by reacting at least one of the anhydride groups with a poly(alkylene oxide) having a single nucleophilic group selected from a primary amino group, secondary amino group, or hydroxyl group. The method still further includes forming a silicon-containing pendant group by reacting at least one of the anhydride groups with a silane having a first functional group selected from a primary amino group, secondary amino group, or hydroxyl group plus a second functional group that is a silicon-containing group. The method yet further includes forming a tertiary amino-containing pendant group by reacting at least one of the anhydride groups with an amine compound having a first functional group selected from a primary amino group, secondary amino group, or hydroxyl group plus a second functional group that is a tertiary amino group. The tertiary amino-containing pendant group is then treated with an alkylating agent to form a quaternary amino-containing pendant group.

In a fourth aspect, an article is provided. The article includes a substrate and a coating adjacent to the substrate. The coating contains a polymeric material having a plurality of pendant groups. The pendant groups include (1) a first pendant group containing a —COOH group or a salt thereof; (2) a second pendant group containing a poly(alkylene oxide) group; (3) a third pendant group having a silicon-containing group; and (4) a fourth pendant group containing a quaternary amino group.

In a fifth aspect, a method is provided for preparing a surface that is antifouling, antimicrobial, or both. The method includes providing a substrate and applying a coating to a surface of the substrate. The coating contains a polymeric material having a plurality of pendant groups including (1) a first pendant group containing a —COOH group or a salt thereof; (2) a second pendant group containing a poly(alkylene oxide) group; (3) a third pendant group having a silicon-containing group; and (4) a fourth pendant group containing a quaternary amino group.

In a sixth aspect, a composition is provided. The composition includes a liquid and a polymeric material dissolved in the liquid. The liquid includes water, organic solvent, or a mixture thereof. The polymeric material has a plurality of pendant groups including (1) a first pendant group containing a —COOH group or a salt thereof; (2) a second pendant group containing a poly(alkylene oxide) group; (3) a third pendant group having a silicon-containing group; and (4) a fourth pendant group containing a quaternary amino group.

DETAILED DESCRIPTION OF THE INVENTION

Polymeric materials are provided that can contain a plurality of different pendant groups. Methods of making the polymeric material and compositions that contain the polymeric material are also provided. Additionally, articles with coatings that contain the polymeric material are provided. The polymeric material in the coatings is often crosslinked. The coatings can be antifouling, antimicrobial, or both.

As used herein, the terms "a", "an", and "the" are used interchangeably with "at least one" to mean one or more of the elements being described.

The terms "polymer" or "polymeric" refer to a material that is a homopolymer, copolymer, terpolymer, or the like. Likewise, the terms "polymerize" or "polymerization" refer to the process of making a homopolymer, copolymer, terpolymer, or the like.

The term "antifouling" refers to material that prevents or retards the formation of a biofilm on a surface. The antifouling material may work by preventing or reducing the adhesion of microorganisms to the surface.

The term "antimicrobial" refers to material that kills microorganisms or inhibits their growth.

The term "silane" refers to a compound having four groups attached to a silicon atom. That is, the silane has a silicon-containing group.

The term "alkoxysilyl" refers to a silicon-containing group having an alkoxy group bonded directly to the silicon atom. The alkoxysilyl can be, for example, of formula —Si(OR)$(R^x)_2$ where R is an alkyl and each $R^x$ is independently a hydroxy, alkoxy, alkyl, perfluoroalkyl, aryl, aralkyl, or part of a silicone.

The term "hydroxylsilyl" refers to a silicon-containing group having a hydroxyl group bonded directly to the silicon atom. The hydroxylsilyl can be, for example, of formula —Si(OH)$(R^x)_2$ where $R^x$ is an alkyl, perfluoroalkyl, aryl, aralkyl, alkoxy, hydroxyl, or part of a silicone. A compound having a hydroxylsilyl group is often referred to as a "silanol". Silanols are a subset of silanes.

The term "silicone" refers to a moiety that contains a silicon-oxygen-silicon linkage group. Any other suitable groups can be attached to the silicon atoms. Such a linkage can result from the reaction of a first silane (e.g., a first silicon-containing group such as a first alkoxysilyl group or hydroxysilyl group) with a second silane (e.g., a second silicon-containing group such as a second alkoxysilyl group or hydroxysilyl group). In some embodiments, the silicone is part of a "silicone network". A silicone network results with a first silane (i.e., a first silicon-containing group) reacts with a second silane (e.g., a second silicon-containing group) plus a third silane (e.g., a third silicon-containing group such as a third alkoxysilyl group or hydroxysilyl group) or when a first silane (e.g., a first silicon-containing group) reacts with a second silane (e.g., a second silicon-containing group) plus a third silane (e.g., a third silicon-containing group) and a fourth silane (e.g., a fourth silicon-containing group such as a fourth alkoxysilyl group or hydroxysilyl group).

The polymeric material that is provided is the reaction product of a polymeric precursor having a plurality of anhydride groups with a plurality of different nucleophilic compounds. The reaction of the polymeric precursor with the plurality of different nucleophilic compounds typically results in the formation of a polymeric material with a plurality of different pendent groups. As used herein, the term "polymeric precursor" refers to a polymeric material that is used as a reactant to form the polymeric material with a plurality of different pendant groups. The original polymeric precursor has greater than four anhydride groups. The polymeric material with a plurality of pendant groups is derived from the polymeric precursor.

As used herein, the phrases "polymeric material with a plurality of pendant groups", "polymeric material with multiple pendant groups", or similar phrases are used interchangeably to refer to a polymeric material that has at least 4 different types of pendant groups. The multiple pendant groups include (1) a first pendant group containing a carboxyl group or a salt thereof; (2) a second pendant group containing a poly(alkylene oxide) group; (3) a third pendant group having a silicon-containing group; and (4) a fourth pendant group containing a quaternary amino group. The polymeric material with multiple pendant groups can be crosslinked through a condensation reaction of multiple silicon-containing groups.

Any polymeric precursor having a plurality of anhydride groups can be used as the starting material to prepare the polymeric material with multiple pendant groups. Although the anhydride groups are often along the backbone of the polymeric precursor, the anhydride groups can be anywhere on the polymeric precursor such as in pendant groups. In many embodiments, the polymeric precursor is the reaction product of a monomer mixture containing a first monomer having both an ethylenically unsaturated group and an anhydride group and a second monomer having an ethylenically unsaturated group. For example, the first monomer is often maleic anhydride. The second monomer is often selected, for example, from a vinyl ether (e.g., methyl vinyl ether), alkene (e.g., ethylene, propylene, isopropylene, butylene, and isobutylene), vinyl aryl (e.g., styrene), acrylonitrile, allyl acetate, vinyl acetate, vinyl chloride, alkyl (meth)acrylate (e.g., methyl (meth)acrylate, ethyl (meth)acrylate, propyl (meth)acrylate, and butyl (meth)acrylate), stilbene, isostilbene, norbornene, vinylidene chloride, and N-vinylpyrrolidone.

Some exemplary polymeric precursors have repeat units of the following Formula (V).

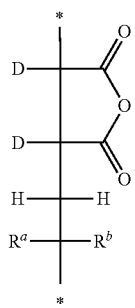

Each D group in Formula (V) is independently hydrogen or alkyl. Suitable alkyl groups for D often have 1 to 10 carbon atoms, 1 to 6 carbon atoms, 1 to 4 carbon atoms, or 1 to 3 carbon atoms. In most embodiments, each D is hydrogen. Each $R^a$ is independently hydrogen or alkyl, and each $R^b$ is independently hydrogen, alkyl, alkoxy, aryl, or aralkyl (i.e., an aralkyl is an alkyl substituted with an aryl). These polymeric precursors with repeat units of Formula (V) can be, for example, the reaction product of an anhydride monomer such as maleic anhydride (i.e., each D in Formula (V) is hydrogen) with at least one other monomer (i.e., second monomer) of formula $H_2C=CR^aR^b$. Although higher or lower amounts of the anhydride monomer can be included in the polymeric precursor, the polymeric precursor is often the reaction product of a monomer mixture containing 10 to 90 mole percent anhydride monomer and 90 to 10 mole percent of the second monomer. Higher or lower amounts of the anhydride monomer can be included in the polymeric precursor. In some examples, the polymeric precursor can be prepared from 20 to 80 mole percent of the anhydride monomer and 80 to 20 mole percent of the second monomer, 25 to 75 mole percent of the anhydride monomer and 75 to 25 mole percent of the second monomer, 30 to 70 mole percent of the anhydride monomer and 70 to 30 mole percent of the second monomer, 40 to 60 mole percent of the anhydride monomer and 60 to 40 mole percent of the second monomer, 45 to 55 mole percent of the anhydride monomer and 55 to 45 mole percent of the second monomer, or about 50 mole percent of the anhydride monomer and about 50 mole percent of the second monomer.

Suitable alkyl groups for $R^a$ and $R^b$ often have 1 to 20 carbon atoms, 1 to 16 carbon atoms, 1 to 12 carbon atoms, 1 to 10 carbon atoms, 1 to 8 carbon atoms, 1 to 6 carbon atoms, or 1 to 4 carbon atoms. Suitable alkoxy groups are of formula —OR where R is an alkyl having 1 to 20 carbon atoms, 1 to 16 carbon atoms, 1 to 12 carbon atoms, 1 to 10 carbon atoms, 1 to 8 carbon atoms, 1 to 6 carbon atoms, or 1 to 4 carbon atoms.

Suitable aryl groups are typically carbocyclic and often have 6 to 12 carbon atoms. For example, the aryl group can be a phenyl groups that is unsubstituted or further substituted with an alkyl group. Aralkyl groups refer to an alkyl group that is substituted with an aryl group. Most aralkyl groups have an alkyl group with 1 to 10 carbon atoms, 1 to 6 carbon atoms, or 1 to 4 carbon atoms that is substituted with an aryl group having 6 to 12 carbon atoms such as phenyl.

Some exemplary polymeric precursors with repeat units of Formula (V) have $R^a$ equal to hydrogen and $R^b$ equal to an alkoxy or an alkyl. Polymeric precursors having repeat units of Formula (V) with D equal to hydrogen, $R^a$ equal to hydrogen, and $R^b$ equal to methoxy are commercially available, for example, under the trade designation GANTREZ from ISP Corporation (Wayne, N.J.). These copolymers are the reaction product of maleic anhydride and methyl vinyl ether. Polymeric precursors with D equal to hydrogen, $R^a$ equal to hydrogen, and $R^b$ equal to hexadecyl are commercially available, for example, under the trade designation PA-18 from Chevron Phillips Chemical Co. (The Woodlands, Tex.). These copolymers are the reaction product of maleic anhydride and octadecene.

Other exemplary polymeric precursors having repeat units of Formula (V) have $R^a$ and $R^b$ each equal to hydrogen. These polymeric precursors, which can be the reaction product of maleic anhydride and ethylene, are commercially available under the trade designation ZEMAC from Vertellus Specialties (Indianapolis, Ind.). Still other exemplary polymeric precursors have $R^a$ and $R^b$ each equal to an alkyl. Polymeric precursors with $R^a$ and $R^b$ both equal to methyl and D equal to hydrogen are commercially available under the trade designation ISOBAM from Kuraray America (Houston, Tex.). These copolymers are the reaction product of maleic anhydride and isobutylene.

Yet other exemplary polymeric precursors with repeat units of Formula (V) have $R^a$ equal to hydrogen and $R^b$ equal to an aryl group. Polymeric precursors with D equal to hydrogen, $R^a$ equal to hydrogen, and $R^b$ equal to phenyl are commercially available from several manufacturers such as, for example, Sartomer Co. (Exton, Pa.). These copolymers are the reaction product of maleic anhydride and styrene.

Various nucleophilic compounds are reacted with the polymeric precursor having a plurality of anhydride groups to form the polymeric material with multiple pendant groups. As used herein, the term "nucleophilic compound" refers to a compound having at least one nucleophilic group selected from a primary amino group, secondary amino group, or hydroxyl group. The nucleophilic compound is of formula HQ-Z where the nucleophilic group can be represented by the formula -QH and Z represents the remainder of the nucleophilic compound (i.e., Z is a group equal to the nucleophilic compound minus the nucleophilic group). The nucleophilic group -QH can be a hydroxyl group (i.e., Q is equal to oxy), a primary amino group (i.e., Q is equal to —$NR^1$—where $R^1$ is hydrogen), or a secondary amino group (i.e., Q is equal to —$NR^1$—where $R^1$ is an alkyl, aryl, or aralkyl). When a nucleophilic compound reacts with an anhydride group of the polymeric precursor of Formula (V), the anhydride ring is opened. This reaction is shown below for one anhydride unit of the polymeric precursor where Formula (VI) represents the anhydride group before reaction and Formula (VII) or a salt thereof represents the ring-opened anhydride group. Formula (VI) is the anhydride portion of Formula (V).

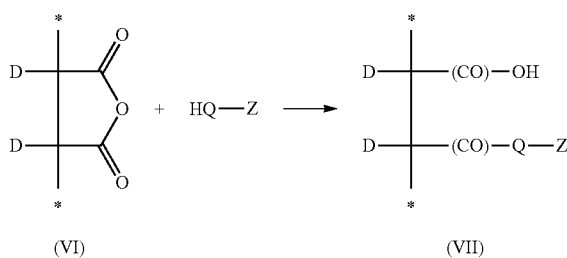

(VI)                    (VII)

In Formula (VI) and (VII), the group D is hydrogen or an alkyl. Group D is often hydrogen and the polymeric precursor is the reaction product of a monomer mixture that includes maleic anhydride.

Depending on the pH of the reaction mixture, the ring-opened reaction product of Formulas (VII) can have a carboxyl group (—COOH) as shown or a salt thereof. The first pendant group contains this carboxyl group (i.e., —COOH) or salt thereof. Any suitable cation can be included in the salt. If the polymeric material is dissolved in a liquid such as water, an organic solvent, or a mixture thereof, the cation of the salt is typically selected to provide solubility of the polymeric material in the liquid. Exemplary cations include, but are not limited to, alkaline metal ions (e.g., sodium ions, potassium ions, or lithium ions), alkaline earth metal ions (e.g., calcium ions, magnesium ions, strontium ions, or barium ions), transition metal ions (e.g. silver ions, copper ions, nickel ions, or zinc ions), ammonium ions, and ammonium ions substituted with one or more alkyl groups, one or more aryl groups, one or more aralkyl groups, or a combination thereof If the cation is multivalent, it can be associated with multiple carboxyl groups. If the cation is polyvalent, the length of the pendant poly(alkylene oxide) group on the polymeric material can be adjusted (e.g., increased), if needed, to avoid coagulation.

The reaction of the polymeric precursor with the various nucleophilic compounds results in the formation of various different pendant groups from the polymeric material. The pendant groups often extend from the backbone of the polymeric material but can extend from a side chain of the polymeric material (e.g., the pendant group can extend from another pendant group). For example, the units of Formula (VII) have pendant group of formula —(CO)-Q-Z plus a pendant group that is a carboxyl group —(CO)OH or a salt of the carboxyl group. There are at least three different types of residual groups Z. That is, at least some Z groups are poly(alkylene oxide)-containing groups, at least some Z groups are silicon-containing groups, and at least some Z groups are quaternary amino-containing groups.

The second pendant group includes a poly(alkylene oxide) and is often of formula —(CO)-Q-$(R^2O)_n R^3$. Group Q is an oxy or a divalent group of formula —$NR^1$— where $R^1$ is selected from hydrogen, alkyl, aryl, or aralkyl. Suitable alkyl groups for $R^1$ often have 1 to 20 carbon atoms, 1 to 10 carbon atoms, 1 to 6 carbon atoms, 1 to 4 carbon atoms, or 1 carbon atoms. Suitable aryl groups for $R^1$ often have 6 to 12 carbon atoms. Some exemplary aryl groups are phenyl groups that can be unsubstituted or substituted with one or more alkyl groups. Suitable aralkyl groups for $R^1$ are alkyl groups such as those having 1 to 10 carbon atoms, 1 to 6 carbon atoms, or 1 to 4 carbon atoms that are substituted with an aryl group having 6 to 12 carbon atoms such as phenyl. In many embodiments, Q is oxy or —NH—. Each group $R^2$ is an alkylene that is linear or branched. The alkylene often has 2 to 6 carbon atoms, 2 to 5 carbon atoms, or 2 to 4 carbon atom. Group $R^2$ is often ethylene, n-propylene, iso-propylene, or a mixture thereof Group $R^3$ is often an alkyl having 1 to 30 carbon atoms, 1 to 20 carbon atoms, 1 to 10 carbon atoms, 1 to 6 carbon atoms, or 1 to 4 carbon atoms. The variable n is an integer greater than 1. In many embodiments, n is greater than 2, greater than 5, greater than 10, or greater than 20.

The third pendant group includes a silicon-containing group. This pendant group can be used to crosslink the polymeric material, to attach the polymeric material to a substrate, or both. The silicon-containing pendant group is often of formula —(CO)-Q-$L^1$-Si$(OR^4)(R^5)_2$. Group Q is the same as described above for the second pendant group. The group $L^1$ is a first linking group that contains an alkylene or heteroalkylene. Suitable alkylene groups for $L^1$ often have 1 to 20 carbon atoms, 1 to 10 carbon atoms, 1 to 6 carbon atoms, or 1 to 4 carbon atoms. Suitable heteroalkylene groups for $L^1$ often have 1 to 20 carbon atoms and 1 to 10 heteroatoms, 1 to 10 carbon atoms and 1 to 5 heteroatoms, or 1 to 6 carbon atoms and 1 to 3 heteroatoms. Many heteroalkylene groups contain oxy groups, thio groups, or —NH-groups as the heteroatoms. Group $L^1$ can further include other optional groups selected from an arylene (e.g., phenylene), carbonyl, carbonyloxy, carbonylimino, oxy, thio, —$NR^1$—, or combinations thereof Group $R^4$ is hydrogen, an alkyl, or a part of a silicone. Each $R^5$ is independently a hydroxyl, alkoxy, alkyl, perfluoroalkyl, aryl, aralkyl, or part of a silicone. Suitable alkyl groups for $R^4$ as well as suitable alkyl, perfluoroalkyl, and alkoxy groups for $R^5$ often have 1 to 10 carbon atoms, 1 to 6 carbon atoms, 1 to 4 carbon atoms, or 1 to 3 carbon atoms. Suitable aryl groups for $R^5$ often have 6 to 12 carbon atoms such as phenyl. Suitable aralkyl groups for $R^5$ often have an alkyl group with 1 to 10 carbon atoms, 1 to 6 carbon atoms, or 1 to 4 carbon atoms substituted with an aryl having 6 to 12 carbon atoms such as phenyl.

When the silicon-containing pendant groups are crosslinked, $R^4$ or both $R^4$ and $R^5$ can be part of a silicone. That is, $R^4$ and $R^5$ can include at least one other silicon-containing moiety and the silicone often contains multiple silicon-oxygen-silicon linkages. A silicone forms upon crosslinking a first silicon-containing group such as a first alkoxysilyl group or hydroxysilyl group to a second silicon-containing group such as a second alkoxysilyl group or hydroxysilyl group. Often, the resulting silicone further reacts with a third silicon-containing group or with both a third and fourth silicon-containing group to form a silicone. The third or fourth silicon-containing group can independently be an alkoxysilyl or hydroxysilyl group.

The fourth pendant group includes a quaternary amino-containing group. This pendant group, at least in some embodiments, can impart antimicrobial characteristic to the final polymeric material. The quaternary amino-containing group is often of formula —(CO)-Q-$L^2$-[$N(R^6)_2(R^7)$]$^+X^-$. As described for the second pendant group, each Q is independently oxy or —$NR^1$—where $R^1$ is selected from a hydrogen, alkyl, aryl, or aralkyl. The group $L^2$ is a second linking group that contains an alkylene or heteroalkylene. Group $L^2$ can further include other optional groups selected from an arylene (e.g., phenylene), carbonyl, carbonyloxy, carbonylimino, oxy, thio, —$NR^1$—, or combinations thereof. Each $R^6$ is independently an alkyl, aryl, or aralkyl. Suitable alkyl groups for $R^6$ often have 1 to 20 carbon atoms, 1 to 10 carbon atoms, 1 to 6 carbon atoms, 1 to 4 carbon atoms, 1 to 3 carbon atoms, or 1 carbon atom. Suitable aryl groups for $R^6$ often have 6 to 12 carbon atoms. Some exemplary aryl groups are phenyl groups that can be unsubstituted or substituted with one or more alkyl groups. Suitable aralkyl groups for $R^6$ are alkyl groups such as those having 1 to 10 carbon atoms, 1 to 6 carbon atoms, or 1 to 4 carbon atoms that are substituted with an aryl group having 6 to 12 carbon atoms such as phenyl.

Group $R^7$ is an alkyl that often has at least 6 carbon atoms, at least 8 carbon atoms, or at least 10 carbon atoms and that can be linear or branched. Suitable alkyl groups for $R^7$ often have up to 30 carbon atoms, up to 24 carbon atoms, up to 20 carbon atoms, or up to 18 carbon atoms. For example, the $R^7$ alkyl group can have 6 to 30 carbon atoms, 8 to 30 carbon atoms, 10 to 30 carbon atoms, 10 to 24 carbon atoms, or 10 to 20 carbon atoms. The group $X^-$ is an anion. Although the anion in the formula is shown as having a charge equal to one in the interest of simplicity, the anion can be multivalent and associated with multiple quaternary amino-containing groups. Suitable anions include, but are not limited to, halide, carboxylate, sulfate, phosphate, nitrate, or the like. If the anion is polyvalent, the length of the pendant poly(alkylene oxide) group can be adjusted (e.g., increased), if needed, to avoid coagulation.

In some embodiments, the polymeric material further includes an additional fifth pendant group that includes an alkoxycarbonyl group. The alkoxycarbonyl group is typically of formula $—(CO)OR^8$ where group $R^8$ is an alkyl. The alkyl group often has 1 to 10 carbon atoms, 1 to 6 carbon atoms, 1 to 4 carbon atoms, or 1 to 3 carbon atoms.

In the polymeric material with multiple pendant groups, the molar amount of the carboxyl group or salt thereof is typically at least equal to the molar amount of the second pendant group containing a poly(alkylene oxide) group plus the molar amount of the third pendant group containing a silicon-containing group plus the molar amount of the fourth pendant group containing the quaternary amino-containing group. Stated differently, there is usually a mole of carboxyl groups or salts thereof for every mole of poly(alkylene oxide) groups, for every mole of silicon-containing groups, and for every mole of quaternary amino-containing groups.

Either before or after crosslinking, the polymeric material with multiple pendant groups contains (a) at least one divalent unit of Formula (I) or a salt thereof;

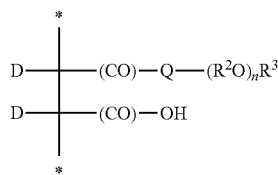

(I)

(b) at least one divalent unit of Formula (II) or a salt thereof; and

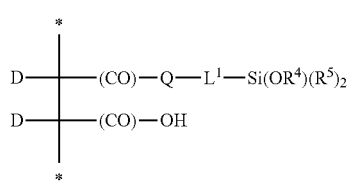

(II)

(c) at least one divalent unit of Formula (III) or salt thereof.

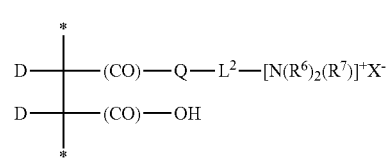

(III)

In these formulas, each D is independently hydrogen or an alkyl. Each Q is independently oxy or $—NR^1—$ where $R^1$ is selected from a hydrogen, alkyl, aryl, or aralkyl. Each $R^2$ is independently an alkylene and $R^3$ is an alkyl. Group $R^4$ is independently hydrogen, an alkyl, or a part of a silicone. Each $R^5$ is independently an alkyl, hydroxyl, alkoxy, perfluoroalkyl, aryl, aralkyl, or part of a silicone. Each $R^6$ is independently an alkyl, aryl, or aralkyl and $R^7$ is an alkyl. The group $L^1$ is a first linking group that contains an alkylene or heteroalkylene. Similarly, group $L^2$ is a second linking group that contains an alkylene or heteroalkylene. Groups $L^1$ and $L^2$ can each independently further include other optional groups selected from an arylene (e.g., phenylene), carbonyl, carbonyloxy, carbonylimino, oxy, thio, $—NR^1—$, or combinations thereof. Variable n is an integer greater than 1. The group $X^-$ is an anion. Any suitable anion can be used such as, for example, a halide, carboxylate, sulfate, phosphate, nitrate, or the like. When the anion is multivalent, it is usually associated with more than one anionic group.

In many embodiments, the polymeric material having units of Formulas (I), (II), and (III) or salts thereof further contains at least one divalent group of Formula (IVa), at least one divalent group of Formula (IVb), or a mixture thereof.

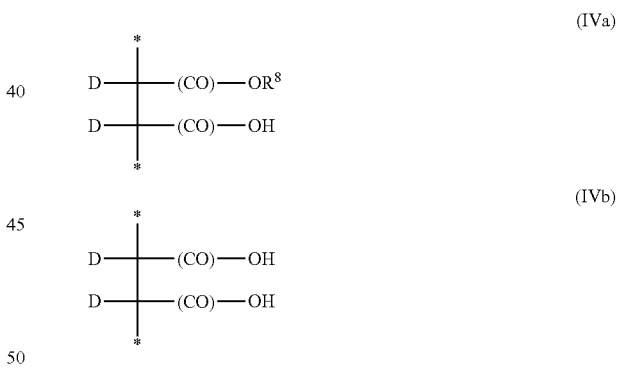

Group $R^8$ is an alkyl. Suitable alkyl groups often have 1 to 10 carbon atoms, 1 to 6 carbon atoms, 1 to 4 carbon atoms, or 1 to 3 carbon atoms.

The polymeric material is typically prepared by the stepwise reaction of the polymeric precursor having a plurality of anhydride groups with at least three different nucleophilic compounds. A pendant tertiary amino-containing group can be treated with an alkylating agent to form a quaternary amino group. The reaction of the polymeric precursor with the various nucleophilic agents and then with the alkylating agent typically occurs in an organic solvent. Initially, the polymeric precursor having a plurality of anhydride groups is dissolved in an aprotic solvent. Aprotic solvents are typically used because such solvents, in contrast to protic solvents, do not react with the anhydride groups of the polymeric precursor or intermediate polymeric material. Any suitable aprotic solvent that can dissolve the polymeric precursor or an intermediate polymeric material can be used. Suitable aprotic solvents are often dipolar and include, but are not limited to, dimethyl formamide (DMF), dimethyl sulfoxide (DMSO), 1,3-dixolane, tetrahydrofuran (THF), acetone, methyl ethyl ketone, acetonitrile, ethyl acetate, or a mixture thereof. Any suitable concentration of the polymeric precursor in the aprotic solvent can be used. In many embodiments, the concentration of polymeric precursor in the aprotic solvent is at least 5 weight percent, at least 10 weight percent, at least 15 weight percent, or at least 20 weight percent based on the total solution weight.

As used herein, the phrase "intermediate polymeric material" is used to refer to a reaction intermediate prepared during the process of forming the polymeric material with multiple pendant groups. The intermediate typically has non-reacted anhydride groups and is lacking at least one of the following pendant groups: (1) a pendant group containing a poly(alkylene oxide) group; (2) a pendant group containing a silicon-containing group; or (3) a pendant group containing a quaternary amino group. However, the intermediate polymeric material has at least one of these groups plus a pendant carboxyl group or salt thereof.

Although the reaction order with the various nucleophilic compounds can be varied somewhat, the order is often selected such that each successive reaction product (intermediate polymeric material or final polymeric material) remains soluble in the solvent system. In many embodiments, the polymeric precursor is reacted first with poly(alkylene oxide), then with the silane, and finally with a tertiary amine that is subsequently treated with an alkylating agent. The polarity of the solvent is usually increased as more carboxyl groups are formed during the course of the various reactions to the form the polymeric material.

The first nucleophilic compound that is usually reacted with the polymeric precursor is a poly(alkylene oxide) having a single nucleophilic group. The single nucleophilic group can be a primary amino group, secondary amino group, or hydroxyl group. The nucleophilic group is often a first end group of the poly(alkylene)oxide and the second end group is an alkyl group. The alkyl end group can facilitate solubility of the poly(alkylene oxide) in the aprotic solvent. Suitable poly(alkylene oxides) often are of Formula (VIII).

(VIII)

In Formula (VIII), $R^2$ is an alkylene that is linear or branched. Suitable alkylene $R^2$ groups often have 2 to 6 carbon atoms, 2 to 5 carbon atoms, or 2 to 4 carbon atom. In many embodiments, $R^2$ is ethylene, n-propylene, iso-propylene, or a mixture thereof. Group $R^3$ is an alkyl and often has 1 to 30 carbon atoms, 1 to 20 carbon atoms, 1 to 10 carbon atoms, 1 to 6 carbon atoms, or 1 to 4 carbon atoms. The variable n is an integer greater than 1. In many embodiments, n is greater than 2, greater than 5, greater than 10, or greater than 20. Group Q is oxy or $-NR^1-$ where $R^1$ is hydrogen, alkyl, aryl, or aralkyl.

Any suitable molecular weight of the poly(alkylene oxide) of Formula (VIII) can be used. In many embodiments, the weight average molecular weight of the poly(alkylene oxide) is at least 200 g/mole, at least 500 g/mole, at least 1000 g/mole, or at least 2000 g/mole. The weight average molecular weight often can be up to 10,000 g/mole, up to 8000 g/mole, up to 6000 g/mole, or up to 4000 g/mole. For example, the weight average molecular weight can be in the range of 200 to 10,000 g/mole, in the range of 200 to 6000 g/mole, in the range of 200 to 4000 g/mole, in the range of 500 to 4000 g/mole, in the range of 1000 to 4000 g/mole, in the range of 500 to 200 g/mole, or in the range of 500 to 1000 g/mole.

The poly(alkylene oxide) of Formula (VIIII) is often a poly(ethylene oxide), polypropylene oxide), or a poly(ethylene oxide)/poly(propylene oxide) copolymer. In many embodiments, the nucleophilic end group is a primary amino group. Primary amino groups tend to react faster with anhydride groups than secondary amino groups or hydroxyl groups. Some exemplary poly(alkylene oxides) are poly(ethylene oxides) with a single primary amino end group. Suitable poly(alkylene oxides) are commercially available under the trade designation JEFFAMINE from Huntsman (The Woodlands, Tex.).

The reaction of the poly(alkylene oxide) having a single nucleophilic group with the polymeric precursor often occurs in the same aprotic solvent used to dissolve the polymeric precursor. Preferably, the product of this reaction is soluble in the aprotic solvent. If not, the solvent composition is typically adjusted so that both the reactants and the product (i.e., the intermediate polymeric material) are soluble. This reaction typically occurs at room temperature or at temperatures close to room temperature.

The poly(alkylene oxide) is often added in an amount sufficient to react with up to 25 mole percent of the total number of anhydride groups in the polymeric precursor. As used herein, the total number of anhydride groups in the polymeric precursor refers to the amount of anhydride groups in the original polymeric precursor prior to reaction with any nucleophilic compounds. In some embodiments, poly(alkylene oxide) is added in an amount to react with up to 20 mole percent, up to 15 mole percent, or up to 10 mole percent of the total number of anhydride groups. Typically, at least 1 mole percent, at least 2 mole percent, at least 3 mole percent, or at least 5 mole percent of the total number of anhydride groups in the polymeric precursor are reacted with the poly(alkylene oxide). For example, poly(alkylene oxide) can be added in an amount sufficient to react with 1 to 25 mole percent, 5 to 25 mole percent, 5 to 20 mole percent, or 5 to 15 mole percent of the anhydride group in the polymeric precursor.

Although the order can be varied somewhat, the second nucleophilic compound that is reacted with the polymeric precursor or intermediate polymeric material is typically a silane. Suitable silanes have a nucleophilic group plus a silicon-containing group. That is, suitable silanes have a first functional group selected from a primary amino group, a secondary amino group, or a hydroxyl group plus a second functional group that is a silicon-containing group. The silicon-containing group is usually an alkoxysilyl group of formula $-Si(OR^c)(R^d)_2$. Group $R^c$ is typically an alkyl and $R^d$ is an alkyl, perfluoroalkyl, aryl, aralkyl, or alkoxy. Suitable alkyl groups for $R^c$ and suitable alkyl, perfluoroalkyl, and alkoxy groups for $R^d$ often have 1 to 10 carbon atoms, 1 to 6 carbon atoms, 1 to 4 carbon atoms, or 1 to 3 carbon atoms. Suitable aryl groups for $R^d$ often have 6 to 12 carbon atoms. Suitable aralkyl groups for $R^d$ often have an alkyl group with 1 to 10 carbon atoms, 1 to 6 carbon atoms, or 1 to 4 carbon atoms that is substituted with an aryl having 6 to 12 carbon atoms such as phenyl.

Suitable silane compounds that can be reacted with anhydride groups of the polymeric precursor or intermediate polymeric material are often of Formula (IX).

(IX)

In Formula (IX), Group Q is oxy or $-NR^1-$ where $R^1$ is hydrogen, alkyl, aryl, or aralkyl. Groups $R^c$ and $R^d$ are the same as defined above. The rate of hydrolysis of the silanes often increases as the number of carbon atoms in $R^c$ decreases. The rate of hydrolysis can affect the ease of forming crosslinks and the ease of attaching the polymeric material to a substrate. Group $L^1$ is a first linking group that typically includes an alkylene or heteroalkylene groups. Suitable alkylene groups often have 1 to 20 carbon atoms, 1 to 10 carbon atoms, 1 to 6 carbon atoms, or 1 to 4 carbon atoms. The heteroalkylene groups often have 1 to 20 carbon atoms and 1 to 10 heteroatoms, 1 to 10 carbon atoms and 1 to 5 heteroatoms, or 1 to 6 carbon atoms and 1 to 3 heteroatoms. Suitable heteroalkylene groups contain oxy groups, thio groups, or —NH-groups as the heteroatoms. Group $L^1$ can further include other optional groups selected from an arylene (e.g., phenylene), carbonyl, carbonyloxy, carbonylimino, oxy, thio, —$NR^1$—, or combinations thereof.

In some embodiments, the silane has a primary amino group (i.e., -QH is —$NH_2$), $R^c$ is an alkyl having 1 to 6 carbon atoms, 1 to 4 carbon atoms, or 1 to 3 carbon atoms, each $R^d$ is an alkoxy having 1 to 10 carbon atoms, 1 to 6 carbon atoms, 1 to 4 carbon atoms, or 1 to 3 carbon atoms, and $L^l$ is an alkylene with 1 to 10 carbon atoms, 1 to 6 carbon atoms, or 1 to 4 carbon atoms.

Exemplary silanes of Formula (IX) include, but are not limited to, aminopropyltrimethoxysilane, aminopropyltriethoxysilane, aminopropyltripropoxysilane, aminopropyltriisopropoxysilane, aminopropyltributoxysilane, aminopropyldimethylmethoxysilane, and aminopropylmethyldiethoxysilane.

The silicon-containing group (e.g., the alkoxysilyl group) of the silane can be used to crosslink the polymeric material, to attach the polymeric material to a substrate, or both. If the number of pendant silicone-containing groups is too small, adhesion to substrates, durability, or both may not be sufficient. On the other hand, if the number of pendant silicone-containing groups is too large, the polymeric material may gel while in a solvent. That is, the polymeric material may not be stable in solution.

Enough silane is typically added to react with up to 30 mole percent of the total anhydride groups in the polymeric precursor. This amount is based on the total number of moles of anhydride available on the original polymeric precursor prior to reaction with any nucleophilic compounds. In some embodiments, silane is added in an amount sufficient to react with up to 25 mole percent, up to 20 mole percent, up to 15 mole percent, or up to 10 mole percent of the anhydride groups of the polymeric precursor. The amount of silane is often added in an amount sufficient to react with at least 1 mole percent, at least 2 mole percent, at least 3 mole percent, or at least 5 mole percent of the anhydride groups. For example, the silane can be added in an amount sufficient to react with 1 to 30 mole percent, 2 to 25 mole percent, 3 to 20 mole percent, 1 to 15 mole percent, or 1 to 10 mole percent of the anhydride groups in the original polymeric precursor.

The reaction of the silane with the anhydride groups of the polymeric precursor (or the intermediate polymeric material) typically occurs at room temperature or at temperatures close to room temperature. The reaction usually occurs in the same aprotic solvent used to dissolve the polymeric precursor or to react the polymeric precursor with the poly(alkylene oxide). If the silane or the reaction product of the silane with the polymeric precursor or intermediate polymeric material is not soluble in the aprotic solvent, the solvent composition is usually altered to maintain solubility. For example, another aprotic solvent with a larger dipole moment can be added. That is, a more polar aprotic solvent can be added to maintain solubility of the intermediate polymeric material that includes both unreacted and reacted (e.g., ring opened) anhydride groups. Because the reacted anhydride groups all have a carboxyl group or a salt thereof, the intermediate polymeric material tends to be more polar than the original polymeric precursor.

Although the order can be varied somewhat, the third nucleophilic compound that is reacted with the polymeric precursor or intermediate polymeric material is typically a tertiary amino-containing compound. The tertiary amino-containing compound typically has a first functional group that is a nucleophilic group plus a second functional group that is a tertiary amino group. The nucleophilic group is selected from a primary amino group, a secondary amino group, or a hydroxyl group. The tertiary amino-containing group is typically of formula —$N(R^6)_2$ where each $R^6$ is independently an alkyl, aryl, or aralkyl. Suitable $R^6$ alkyl groups often have 1 to 20 carbon atoms, 1 to 16 carbon atoms, 1 to 12 carbon atoms, 1 to 8 carbon atoms, 1 to 6 carbon atoms, 1 to 4 carbon atoms, 1 to 3 carbon atoms, or 1 carbon atom. Suitable $R^6$ aryl groups typically are carbocyclic and have 6 to 12 carbon atoms. Aryl groups are often phenyl groups that can be further substituted with an alkyl group. Suitable $R^6$ aralkyl groups have an alkyl group with 1 to 10 carbon atoms, 1 to 6 carbon atoms, or 1 to 4 carbon atoms that is substituted with an aryl group having 6 to 12 carbon atoms such as phenyl. In many embodiments the tertiary group of formula —$N(R^6)_2$ is a dialkylamino group with each alkyl group having 1 to 6 carbon atoms, 1 to 4 carbon atoms, 1 to 3 carbon atoms, or 1 carbon atom.

The tertiary amino-containing compounds are often of Formula (X).

$$HQ\text{-}L^2\text{-}N(R^6)_2 \qquad (X)$$

In Formula (X), Q and $R^6$ are the same as defined previously. Group $L^2$ is a second linking group that typically includes an alkylene or heteroalkylene. Suitable alkylene groups often has 1 to 20 carbon atoms, 1 to 10 carbon atoms, 1 to 6 carbon atoms, or 1 to 4 carbon atoms. Suitable heteroalkylene groups often have 1 to 20 carbon atoms and 1 to 10 heteroatoms or 1 to 10 carbon atoms and 1 to 5 heteroatoms. Suitable heteroalkylene groups contain oxy groups, thio groups, or —NH-groups as the heteroatoms. Group $L^2$ can further include other optional groups selected from an arylene, carbonyl, carbonyloxy, carbonylimino, oxy, thio, —$NR^1$—, or combinations thereof. In many embodiments of Formula (X), the amino group of formula —$N(R^6)_2$ is a dialkylamino group with each alkyl group having 1 to 6 carbon atoms, 1 to 4 carbon atoms, 1 to 3 carbon atoms, or 1 carbon atom.

In some embodiments, the tertiary amino-containing compounds include, but are not limited to, N,N-dimethylaminopropylamine, N,N-dimethylaminoethylamine, N,N-dimethylaminoethanol, N,N-dimethylaminopropanol, N,N-dibutylethanolamine, and N,N-diethylaminoethanol, N,N diethylaminopropylamine, N,N dipropylaminoethanol, N,N dimethylaminobutylamine.

The tertiary amino-containing compound is often added in an amount sufficient to react with up to 75 mole percent of the anhydride groups originally present on the polymeric precursor. In some embodiments, the tertiary amino-containing compound is added in an amount sufficient to react with up to 70 mole percent, up to 60 mole percent, up to 50 mole percent, or up to 40 mole percent of the total anhydride groups present on the polymeric precursor. Typically, at least 5 mole percent, at least 10 mole percent, at least 20 mole percent, at least 25 mole percent, or at least 30 mole percent of the total anhydride groups present on the polymeric precursor are reacted with the tertiary amino-containing compound. The tertiary amino-containing compound often is added in an amount sufficient to react with 5 to 75 mole percent, 5 to 60 mole percent, 10 to 60 mole percent, 20 to 60 mole percent, 20 to 50 mole percent, 30 to 50 mole percent, or 40 to 50 mole percent of the total anhydride groups present on the polymeric precursor. The reaction of the tertiary amino-containing compound with the anhydride group tends to occur at room temperature or at temperatures close to room temperature.

In many embodiments, the poly(alkylene oxide) can be added in an amount sufficient to react with 1 to 25 mole percent of the total number of anhydride groups, the silane can be added in an amount sufficient to react with 1 to 30 mole percent of the total number of anhydride groups, and the tertiary amine in an amount sufficient to react with 5 to 75 mole percent of the total number of anhydride groups in the polymeric precursor. For some examples, the poly(alkylene oxide) can be added in an amount sufficient to react with 5 to 20 weight percent of the total number of anhydride groups, the silane can be added in an amount sufficient to react with 5 to 30 mole percent of the total number of anhydride groups, and the tertiary amine can be added in an amount sufficient to react with 20 to 60 mole percent of the total number of anhydride groups in the polymeric precursor, In other examples, the poly(alkylene oxide) can be added in an amount sufficient to react with 10 to 20 weight percent of the total number of anhydride groups, the silane can be added in an amount sufficient to react with 5 to 20 weight percent of the total number of anhydride groups, and the tertiary amine can be added in an amount sufficient to react with 40 to 50 mole percent in the total number of anhydride groups in the polymeric precursor. Any remaining anhydride groups are typically reacted with an alcohol or water. Often, 1 to 20 mole percent, 5 to 15 mole percent, or 5 to 10 mole percent of the total number of anhydride groups present in the polymeric precursor are reacted with water, alcohol, or both.

The total amount of the poly(alkylene oxide), silane, and tertiary amino-containing compound is usually sufficient to react with no greater than 95 mole percent, no greater than 90 mole percent, no greater than 85 mole percent, or no more than 80 mole percent of the total amount of anhydride groups present in the original polymeric precursor. An excess of anhydride groups can help drive to completion the reactions with the various nucleophilic compounds. The final polymeric material with a plurality of pendant groups is less likely to be contaminated with excess, non-reacted nucleophilic compounds. Additionally, at least some of the anhydride groups can react with water that might be present in any of the reactants as an impurity or from the atmosphere if the reaction conditions do not exclude atmospheric moisture.

The polarity of the solvent in the reaction mixture usually needs to be adjusted (e.g., increased) prior to reaction with the tertiary amino-containing material. Without this addition, the reaction product is likely to precipitate from solution. The addition of more polar organic solvent can be used to enhance the solubility of the intermediate polymeric material, enhance the solubility of the final polymeric material, or both. Although any suitable polar organic solvent can be used, the polar organic solvent added is often a protic solvent. For example, the polar organic solvent can be an alcohol or a mixture of protic solvents that include an alcohol. For example, the polar organic solvent can be a mixture of a protic solvent such as an alcohol and an aprotic solvent. If a protic solvent is added, it typically is selected to be less reactive than the tertiary amino-containing compound with the anhydride groups.

In many embodiments, the polar organic solvent added prior to the addition of the tertiary amino-containing compound is an alcohol. In some embodiments, suitable alcohols include those of formula R—OH where R is an alkyl group. Suitable alkyl alcohols often have 1 to 10 carbon atoms, 1 to 6 carbon atoms, 1 to 4 carbon atoms, or 1 to 3 carbon atoms. The alcohol added is typically chosen to be less reactive than the tertiary amino-containing compound with the anhydride groups.

The tertiary amino-containing pendant groups, which are formed by reaction of an anhydride group with the tertiary amino-containing compound, can be converted to quaternary amino-containing pendant groups. An alkylating agent is reacted with the tertiary amino-containing pendant groups to form the quaternary amino-containing pendant groups. Suitable alkylating agents typically are alkyl halides. The alkyl group is often linear but can be branched, cyclic, or a combination thereof. The alkyl halides often have at least 6 carbon atoms. In some embodiments, the alkyl halide has at least 8 carbon atoms, at least 10 carbon atoms, at least 12 carbon atoms, or at least 16 carbon atoms. The alkyl halide often has up to 30 carbon atoms, up to 24 carbon atoms, or up to 20 carbon atoms. Some alkylating agents are alkyl halides having 6 to 30 carbon atoms, 8 to 30 carbon atoms, 10 to 30 carbon atoms, 10 to 24 carbon atoms, or 10 to 20 carbon atoms.

The alkylating agent can be added in an amount sufficient to react with up to 100 mole percent of the tertiary-amino containing pendant groups. To minimize contamination of the polymeric material with excess, non-reacted alkylating agent, the mole amount of the alkylating agent is often somewhat less than the total mole amount of tertiary amino-containing pendant groups. For example, the amount of alkylating agent can be selected to react with up to 98 mole percent, up to 95 mole percent, up to 90 mole percent, or up to 85 mole percent of the tertiary amino-containing pendant groups.

The reaction of the pendant tertiary amino-containing group with the alkylating agent typically occurs at temperatures greater than 100° C. in a pressurized container. For example, the temperature can be in the range of 105° C. to 135° C. or in the range 110° C. to 130° C. The reaction conditions are often maintained for at least 4 hours, at least 8 hours, at least 12 hours, at least 16 hours, or at least 20 hours.

In some embodiments where it may be desirable to form a polymeric material with antimicrobial characteristics, the quaternary amino-containing pendant group is often of formula —N($R^6$)$_2$$R^7$ where $R^6$ is an alkyl having 1 to 3 carbon atoms and $R^7$ is an alkyl with 10 to 20 carbon atoms.

Any anhydride groups that do not react with the poly(alkylene oxide), silane, or tertiary amino-containing compound tend to react with any alcohol solvent or other protic organic solvent that is added with the tertiary amino-containing compound. The reaction of an alcohol with an anhydride group tends to result in the formation of an alkoxycarbonyl-containing group of formula —(CO)—O$R^8$ where $R^8$ is an alkyl. In some embodiments, $R^8$ is an alkyl having 1 to 10 carbon atoms, 1 to 6 carbon atoms, or 1 to 4 carbon atoms.

If the polar solvent that is added during the course of the reactions with the various nucleophilic compounds is not a protic solvent such as an alcohol, there may be anhydride groups that remain after addition of all of the nucleophilic compounds. That is, the molar amount of the various nucleophilic compounds reacted is typically selected to be less than the molar amount of anhydride groups in the polymeric precursor. These anhydride groups often undergo hydrolysis with any water that may be present to form carboxyl groups or salts thereof. Even atmospheric water under some conditions can cause hydrolysis of any remaining anhydride groups. Hydrolysis causes the formation of a group with two adjacent carboxyl groups such as shown in Formula (IVb).

Typically, all of the anhydride groups of the original polymeric precursor are reacted with the poly(alkylene oxide), silane, tertiary amino-containing compound, alcohol, or any residual water. That is, the polymeric material with multiple pendant groups typically does not have non-reacted anhydride groups.

In some embodiments, the resulting polymeric material with multiple pendant groups can be provided in the form of a composition such as a solution. More specifically, compositions can be provided that include (a) a liquid and (b) a polymeric material with multiple pendant groups dissolved in the liquid. The multiple pendant groups includes (1) a first pendant group containing a —COOH group or a salt thereof (2) a second pendant group containing a poly(alkylene oxide) group; (3) a third pendant group having a silicon-containing group; and (4) a fourth pendant group containing a quaternary amino group. Any liquid capable of dissolving the polymeric material with multiple pendant groups can be used in the composition. The liquid can be water, an organic solvent, or a mixture thereof.

The compositions can contain up to 60 weight percent of the polymeric material with multiple pendant groups dissolved in the liquid. Some solutions contain up to 55 weight percent, up to 50 weight percent, up to 45 weight percent, up to 40 weight percent, up to 35 weight percent, up to 30 weight percent, up to 25 weight percent, or up to 20 weight percent of the polymeric material with multiple pendant groups based on the total weight of the composition. The composition usually includes at least 1 weight percent, at least 2 weight percent, at least 5 weight percent, or at least 10 weight percent of the polymeric material with multiple pendant groups based on the total weight of the composition. For example, the composition can contain 1 to 60 weight percent, 1 to 50 weight percent, 1 to 40 weight percent, 1 to 30 weight percent, 1 to 20 weight percent, or 1 to 10 weight percent of the polymeric material with multiple pendant groups based on the total weight of the composition.

The liquid in the composition typically includes at least some organic solvent. The organic solvent often includes a protic organic solvent such as an alcohol having 1 to 10 carbon atoms, 1 to 6 carbon atoms, or 1 to 4 carbon atoms. The alcohol is often of formula R—OH where R is an alkyl group and can be, for example, the same alcohol added to the reaction mixture used to prepare the polymeric material with multiple pendant groups. That is, the alcohol can be the same alcohol that is added to facilitate the reaction of the tertiary amino-containing compound with anhydride groups. In many embodiments, the alcohol is an alkyl alcohol with 1 to 4 carbon atoms.

In some compositions, the liquid is predominately an alcohol. If the boiling point of the aprotic solvent used in the synthesis of the polymeric material with multiple pendant groups is lower than the boiling point of the alcohol, the aprotic solvent can be removed using a process such as distillation. In other compositions, the liquid is a mixture of an alcohol and an aprotic solvent. The alcohol and aprotic solvents often include those used during the synthesis of the polymeric material. Although any ratio of the amount of alcohol to the amount of aprotic solvent can be used, the ratio is typically chosen so that the polymeric material is soluble in the solvent mixture. The weight ratio of aprotic solvent to alcohol is often in the range of 50:50 to 5:95. That is, the solvent often contains 5 to 50 weight percent aprotic solvent and 50 to 95 weight percent alcohol based on the total weight of solvent in the composition.

In other composition, the polymeric material with multiple pendant groups is dissolved in a mixture of an organic solvent and water. The organic solvent often includes a protic organic solvent such as an alcohol. Any ratio of organic solvent and water can be used; however, the ratio is typically chosen so that the polymeric material is soluble in the solvent mixture. Also, the ratio is typically chosen so that the water and organic solvent are miscible. For example, the polymeric material with multiple pendant groups can be dissolved in a liquid that is at least 90 weight percent, at least 95 weight percent, or at least 98 weight percent water. Often water is added after preparation of the polymeric material and any organic solvents that may be present with lower boiling points than water are stripped off.

The various compositions can be stable for extended periods of time in on organic solvent such as an alcohol (e.g., an alcohol of formula R—OH where R is an alkyl group having 1 to 10 carbon atoms, 1 to 6 carbon atoms, or 1 to 4 carbon atoms). As used herein, the term "stability" refers a composition containing about 2.5 to 50 weight percent solids that remains flowable for at least one week, for at least 2 weeks, for at least 1 month, for at least 2 months, for at least 6 months, or for at least 1 year. That is, the polymeric material remains in solution and does not crosslink, form a gel, or precipitate.

The polymeric material with multiple pendant groups can also be provided in the form of a coating on a substrate. To prepare a coating composition, the polymeric material with multiple pendant groups is typically dissolved in a liquid that includes water, an organic solvent, or a mixture thereof. If the solvent is not correctly adjusted to match the polarity of the polymeric material, the polymeric material can precipitate from solution and prematurely crosslink. Once the polymeric material has been crosslinked, it can be difficult to dissolve and apply as a coating.

Typically, a coating composition containing the polymeric material with multiple pendant groups and the liquid is applied to a surface of a substrate. Any of the compositions described above that are in the form of solutions can be used to form the coating. Any known method can be used to apply the composition to the surface of the substrate. In many embodiments, the composition is applied to the surface of the substrate using a method such as printing, brushing, spraying, rolling, spreading, dipping, or the like.

Useful substrates include, for example, non-siliceous ceramic materials, siliceous materials such as glasses and siliceous ceramic materials, metals, metal oxides, natural and man-made stones, woven and non-woven fabrics, wood, and polymeric materials that are either thermoplastic polymers or thermoset polymers. Exemplary polymeric materials include, but are not limited to, poly(meth)acrylates, polycarbonates, polystyrenes, polystyrene copolymers such as styrene acrylonitrile copolymers, polyesters such as polyethylene terephthalate, silicones, and polyurethanes.

After application of the composition to the surface of the substrate, the solvent in the composition is removed by drying or evaporation. Drying can be done under an inert atmosphere or in air and at any suitable temperature. As the solvent is removed, the polymeric material tends to crosslink through the silicon-containing pendant groups. Prior to crosslinking, the silicon-containing group is often of formula —Si(OR$^c$)(R$^d$)2 where R$^c$ is an alkyl and R$^d$ is each independently alkoxy, alkyl, perfluoroalkyl, aryl, or aralkyl. In the presence of some water, any alkoxy groups can be converted to hydroxyl groups. The crosslinking reaction then involves the reaction of two silicon-containing groups of formula —Si(OR$^e$)(R$^f$)2 where R$^e$ is hydrogen or alkyl and R$^f$ is hydroxyl, alkoxy, alkyl, perfluoroalkyl, aryl, or aralkyl. That is, the silicon-containing group is an alkoxysilyl group or hydroxylsilyl group.

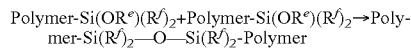
Polymer-Si(OR$^e$)(R$^f$)$_2$+Polymer-Si(OR$^e$)(R$^f$)$_2$→Polymer-Si(R$^f$)$_2$—O—Si(R$^f$)$_2$-Polymer The crosslinking can occur between pendant groups on the same or different polymeric chains. When R$^f$ is hydroxyl or alkoxy, the —Si(R$^f$)$_2$ groups of the crosslinked polymeric material can further crosslink. These crosslinking reactions tend to occur after the polymeric material is coated on a substrate. As the coating is dried, the silicon-containing groups have an increased likelihood of contacting each other to form the crosslink or silicone. The crosslinking reactions typically occur at a temperature above room temperature. For example, the crosslinking (i.e., curing) temperature is often at least 80° C., at least 90° C., or at least 100° C. The curing temperature can often be lowered by the addition of a proton source such as an acid or water. Water can be added either to the coating composition or as vapor while curing.

In some embodiments, to increase the adhesion of the coating to the substrate, the surface of the substrate is selected to contain hydroxyl groups or other groups capable of reacting with the silicone-containing pendant groups or other pendant groups. Any silicon-containing group with a hydrolysable group can react with hydroxyl groups on the surface of the substrate. For example, any unreacted alkoxysilyl or hydroxysilyl group can potentially react with a hydroxyl group on the substrate. The reaction with a hydroxyl group on the surface of the substrate results in the formation of a covalent bond between the substrate and the polymeric material with multiple pendent groups. That is, the substrate is attached to the polymeric material with multiple pendant groups through the silicon-containing pendant group. The reaction is shown below for the reaction of the group —OR$^e$.

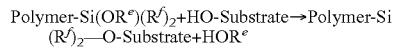
Polymer-Si(OR$^e$)(R$^f$)$_2$+HO-Substrate→Polymer-Si(R$^f$)$_2$—O-Substrate+HOR$^e$ The surface of the substrate with hydroxyl groups can be an inorganic material, an organic material, or a combination of both. The substrate can be a single layer of material having hydroxyl groups or the substrate can include multiple layers with an outer surface having hydroxyl groups.

Exemplary inorganic materials having hydroxyl groups that can react with the silicon-containing group of the polymeric material include glasses, ceramics, or metal oxides. The inorganic materials are often siliceous materials. The inorganic material can be used alone or can be combined with a polymeric binder. Exemplary organic materials that can react with the silicon-containing group of the polymeric material include other polymers having hydroxyl groups such as polyvinyl alcohols, polyurethanes, and hydroxyl substituted esters of poly(meth)acrylates.

Polymeric materials that do not normally have hydroxyl groups can be subjected to corona treatment in an oxygen-containing atmosphere to generate such groups. For example, polyethylene can be subjected to corona treatment in the presence of oxygen to generate hydroxyl groups. Alternatively, perfluorinated polymers can be treated with sodium dissolved in ammonia or by sodium naphthenate dissolved in tetrahydrofuran or other appropriate solvent. This treatment defluorinates the surface and introduces hydroxyl and carboxyl groups.

In some embodiments, the substrate has multiple layers that include a support layer and an outer layer containing siliceous material dispersed in an organic matrix. For example, the siliceous material can be colloidal silica dispersed in a polymeric binder. A coupling agent can be included to facilitate dispersion of the siliceous material in the organic binder. The coupling agent typically has one functional group that can react with the siliceous material and another functional group that enhances adhesion to the support layer. For example, colloidal silica can be dispersed in a polymeric binder using a silane coupling agent. In one specific example, the coupling agent can be a silane that includes a hydrolysable group that be used to attach the coupling agent to the colloidal silica plus a basic amino group that can interact with acidic groups of the support layer. The coupling agent can further include hydroxyl groups that, in addition to the colloidal silica, can be used to react with the silicone-containing pendant groups of the polymeric material.

A priming layer containing siliceous material dispersed in a polymeric binder with an optional coupling agent can be used to increase adhesion of the coatings to substrates with low surface energy. For example, surfaces of a fluorinated polymer or polyolefin are often treated with a primer to form a primer layer prior to application of the coating composition containing the polymeric material with multiple pendant groups. The primer layer often contains siliceous material in a polymeric binder with an optional coupling agent.

The substrate is often cleaned prior to applying the compositions that contain the polymeric material with multiple pendant groups. Cleaning can remove contaminants from the surface of the substrate prior to coating. Cleaning techniques depend on the type of substrate and include, but are not limited to, washing with a solvent such as acetone or ethanol.

The coatings that contain the polymeric group with multiple pendant groups can be used to provide a surface that tends to retard adhesion of microbes. That is, the coatings can provide a surface that is antifouling. The poly(alkylene oxide)-containing pendant groups of the polymeric material tend to favor the formation of surfaces with low adhesion to microbes. The poly(alkylene oxide)-containing pendant groups also tend to enhance the lubricity of the coatings and sorption of water.

The poly(alkylene oxide) pendant group tends to make the resulting polymeric material hydrophilic. Typically, polymeric materials that are more hydrophilic tend to have increased antifouling characteristics compared to polymeric materials that are more hydrophobic. Increasing the number of poly(alkylene oxide) groups, increasing the length of the poly(alkylene oxide) groups, or increasing the molar ratio of poly(alkylene oxide) groups to quaternary amino groups tend to enhance the antifouling characteristic of the polymeric material. Often, for good antifouling characteristics, the weight average molecular weight of the poly(alkylene oxide) groups are at least 500 grams per mole or at least 1000 grams per mole.

Further, the coatings can be biocidal to microbes that do attach. The quaternary amino-containing pendant groups of the polymeric material tend to favor the formation of antimicrobial surfaces particularly if the quaternary amino group is of formula —N(R$^6$)$_2$R$^7$ where R$^7$ is an alkyl having at least 6 carbon atoms such as a linear alkyl having at least 6 carbon atoms. Often R$^7$ has 6 to 30 carbon atoms, 10 to 20 carbon atoms, of 12 to 20 carbon atoms. Some quaternary amino group can have a R$^6$ alkyl group with 1 to 6 carbon atoms, 1 to 4 carbon atoms, 1 to 3 carbon atoms, or 1 carbon atom. For example, the quaternary amino group can have a R$^6$ alkyl group with 1 to 3 carbon atoms and a R$^7$ alkyl group with 10 to 20 carbon atoms. Unlike many quaternary amino-containing polymeric compositions known in the art, the antimicrobial agent is not removed over time from the polymeric material through a mechanism such as extraction or diffusion. That is, the coatings often remain antimicrobial over time Additionally, the coatings tend to be durable because they are usually crosslinked through the pendant silicon-containing groups of the polymeric material. The coatings can be adhered to the substrate though the formation of a covalent bond. This covalent bond is formed by reacting hydroxyl groups on the surface of the substrate with the silicon-containing pendant groups of the polymeric material in the coating. Further, because the polymeric material in the coatings is typically crosslinked, the polymeric material typically cannot be dissolved by typical solvents such as those that would be used to wash the surface of the coating.

Combining the antimicrobial aspects with the antifouling characteristics may enable the coating to remain active longer than a coating with only antimicrobial (e.g. via quaternary amines) functionality. This may be due to the ability of some antifouling coatings to "self-clean" by retarding the adhesion of microbes and organic molecules that might otherwise mask the intended surface chemistry.

The coatings are often clear and can be applied to substrates without altering the appearance of the substrate. That is, the surface of various substrates can be made antifouling, antimicrobial, or both without altering the appearance of the substrate.

EXAMPLES

These examples are merely for illustrative purposes and are not meant to be limiting on the scope of the appended claims. All parts, percentages, ratios, and the like in the examples and the rest of the specification are by weight, unless noted otherwise. Solvents and other reagents used were obtained from Sigma-Aldrich Chemical Company (Milwaukee, Wis.) unless otherwise noted.

| Glossary of Materials | |
|---|---|
| Name | Description |
| GANTREZ AN-119 | Trade designation for a copolymer of methyl vinyl ether and maleic anhydride commercially available from International Specialty Products (Wayne, NJ) |
| JEFFAMINE M-2070 | Trade designation for a poly(ethylene oxide)amine with a single amino end group and with a weight average molecular weight of about 2000 g/mole commercially available from Huntsman Corporation (The Woodlands, TX) |
| Dioxolane | 1,3-dioxolane purchased from Lancaster Chemical |
| APTES | Aminopropyltriethyloxysilane purchased from Sigma-Aldrich (Milwaukee, WI) |
| DMAPrA | N,N-dimethylaminopropylamine purchased from Sigma-Aldrich (Milwaukee, WI) |
| $C_{12}Br$ | Dodecylbromine purchased from Sigma-Aldrich (Milwaukee, WI) |
| DMEA | Dimethylethanolamine purchased from Sigma-Aldrich (Milwaukee, WI) |
| DBEA | N,N-dibutylethanolamine purchased from Sigma-Aldrich (Milwaukee, WI) |
| Isobutylene/maleic anhydride copolymer | Polymeric precursor purchased from Sigma-Aldrich (Milwaukee, WI) |
| DMF | Dimethylformamide purchased from Sigma-Aldrich (Milwaukee, WI) |
| NALCO 1030 | A trade designation of Nalco Company (Naperville, IL) for a colloidal dispersion of silica particles in water. The concentration of $SiO_2$ in the dispersion is 30 weight percent and the average size of the $SiO_2$ particles are 11 to 16 nanometers. |
| DBPrA | N,N-dibutylaminopropylamine purchased from Sigma-Aldrich (Milwaukee, WI) |

Example 1

GANTREZ AN-119 (1 gram) was dissolved in 1,3-dioxolane (4 grams). JEFFAMINE M-2007 (1 gram) dissolved in 1,3-dioxolane (2 grams) was added to the solution of GANTREZ AN-119. The resulting solution, which was dark red, was stirred for 10 minutes. A solution of APTES (0.1 gram) in dioxolane (1 gram) was added. Stirring was continued for another 5 minutes. Methanol (5 grams) was added all at once followed immediately by the addition of a solution of DMAPrA (0.55 grams) in methanol (5 grams). This solution was stirred for 1 hour. Then $C_{12}Br$ (0.7 grams) was added. This reaction solution, which had a slight pink color, was placed in a pressure bottle and heated in an oil bath for 20 hours at 125° C. As the solution warmed up, it took on a hazy appearance and then turned darker in color and began to clear (the haziness disappeared). After heating overnight, the mixture turned blue. After cooling to room temperature, the solution was further diluted to 5 weight percent solids with additional methanol. The methanol solution was stable for more than one week.

Example 2

GANTREZ AN-119 (1 gram) was dissolved in 1,3-dioxolane (5 grams). A solution of JEFFAMINE M-2070 (1 gram) in dioxolane (2 grams) was added to the GANTREZ AN-119 solution with rapid stirring. This solution was stirred for 15 minutes. A solution of APTES (0.1 gram) in dioxolane (1 gram) was added. Stirring was continued for an additional 15 minutes. Then, a solution of DMEA (0.48 grams) dissolved in methanol (5 grams) was added all at once. The mixture was stirred for 2 hours and then $C_{12}Br$ (0.7 grams) was added. This mixture was transferred to a pressure bottle and the mixture was heated in an oil bath at 110° C. for 20 hours. The mixture was dark blue. After cooling, the mixture was diluted to 5 weight percent solids with methanol.

Example 3

GANTREZ AN-119 (1 gram) was dissolved in 1,3-dioxolane (4 grams). A solution of JEFFAMINE M-2070 (1 gram) in dioxolane (2 grams) was added to the GANTREZ AN-119 solution with rapid stirring. This solution was stirred for 10 minutes. The mixture became dark red. A solution of APTES (0.1 gram) in dioxolane (1 gram) was added. Stirring was continued for another 5 minutes. Methanol (5 grams) was added all at once followed immediately by the addition of a solution of DBPrA (1 grams) in methanol (5 grams). This mixture was stirred for 1 hour and then $C_{12}Br$ (0.7 grams) was added. The mixture was transferred to a pressure bottle and heated in an oil bath at 125° C. for 20 hours. After heating for about 30 minutes, the mixture darkened somewhat and took on a greenish color. After heating for the full 20 hours, the mixture had turned a dark blue. The mixture was diluted to 5 weight percent solids by addition of methanol.

Example 4

GANTREZ AN-119 (1 gram) was dissolved in 1,3-dioxolane (4 grams). A solution of JEFFAMINE M-2070 (1 gram) in dioxolane (2 grams) was added to the GANTREZ AN-119 solution with rapid stirring. This solution was stirred for 10 minutes. The mixture became dark red. A solution of APTES (0.1 gram) in dioxolane (1 gram) was added. Stirring was continued for another 5 minutes. A solution of DBEA (0.95 grams) in methanol (5 grams) was added all at once. This mixture was stirred for 2 hour and then $C_{12}Br$ (0.7 grams) was added. This mixture was transferred to a pressure bottle and heated at 125° C. for 20 hours in an oil bath. After cooling, the reaction mixture was diluted to 5 weight percent solids by addition of methanol. The mixture had a slightly yellow color.

Comparative Example 1

GANTREZ AN-119 (1 gram) was dissolved in 1,3-dioxolane (4 grams). A solution of JEFFAMINE M-2070 (1 gram) in dioxolane (1 grams) was added to the GANTREZ AN-119 solution with rapid stirring. This solution was stirred for 10 minutes. The mixture became dark red. A solution of APTES (0.1 gram) in dioxolane (1 gram) was added. Stirring was continued for another 5 minutes. A solution of DMAPrA (0.55 grams) in methanol (5 grams) was added all at once. The solution was diluted to 5 weight percent solids by addition of methanol. The mixture has a pale pink color which fades over time.

Comparative Example 2

GANTREZ AN-119 (1 gram) was dissolved in 1,3-dioxolane (4 grams). A solution of JEFFAMINE M-2070 (1 gram) in dioxolane (2 grams) was added to the GANTREZ AN-119 solution with rapid stirring. This solution was stirred for 10 minutes. The mixture became dark red. A solution of APTES (0.1 gram) in dioxolane (1 gram) was added. Stirring was continued for another 5 minutes. A solution of DMEA (0.48 grams) in methanol (5 grams) was added all at once. This mixture was allowed to stir at this concentration for 24 hours and then diluted to 5 weight percent solids by addition of methanol.

Example 5

Isobutylene/maleic anhydride copolymer (1 gram) was dissolved in DMF (3 grams). A solution of JEFFAMINE M-2070 (1 gram) in dioxolane (2 grams) was added to the copolymer solution with rapid stirring. This solution was stirred for 15 minutes. A solution of APTES (0.1 gram) in dioxolane (1 gram) was added. Stirring was continued for another 10 minutes. A solution of DMAPrA (0.53 grams) in methanol (5 grams) was added. This mixture was stirred for 15 minutes and then $C_{12}Br$ (0.7 grams) was added. The mixture was transferred to a pressure bottle. The mixture was heated with stirring in an oil bath at 125° C. for 24 hours. The mixture was cooled to room temperature and then diluted with additional methanol (53 grams) to give an approximately 5 weight percent solids solution. This solution had a pale yellow color.

Example 6

Isobutylene/maleic anhydride copolymer (1 gram) was dissolved in DMF (3 grams). A solution of JEFFAMINE M-2070 (1 gram) in dioxolane (1 grams) was added to the copolymer solution with rapid stirring. This solution was stirred for 15 minutes. A solution of APTES (0.1 gram) in dioxolane (1 gram) was added. Stirring was continued for another 10 minutes. A solution of aminopropylimazole (0.65 grams) in methanol (5 grams) was added. The mixture was stirred for 15 minutes and then $C_{12}Br$ (0.7 grams) was added. The mixture was transferred to a pressure bottle. The mixture was heated with stirring in an oil bath at 125° C. for 24 hours. The mixture was cooled to room temperature and then diluted with additional methanol to give an approximately 5 weight percent solids solution.

Preparation of Primer Layers and Coatings

Coatings of the polymeric material with multiple pendant groups were prepared by priming polyester sheets with a silica-containing surface. The polymeric material with multiple pendant groups has silicone-containing pendant groups that can be crosslinked and that can serve as binding sites to the silica-containing surface.

The priming composition was prepared by treating an aqueous colloidal silica (NALCO 1030) with a coupling agent. The coupling agent was prepared by the reaction of 3-glycidoxypropyltrimethoxysilane with t-butylamine. More specifically, 3-glydicoxypropyltrimethoxysilane (11.5 grams) was mixed with t-butylamine (3.65 grams). This mixture was heated in a pressure bottle positioned in an oil bath set at 100° C. After heating for 24 hours, the mixture was cooled and diluted to 20 weight percent solids with methanol.

The priming composition was prepared by added methanol (2.5 grams) slowly to NALCO 1030 (5 grams of the 30 weight percent dispersion) with rapid stirring. This was followed by drop wise addition of the coupling agent solution (0.4 grams of a 20 weight percent solution of the coupling agent in methanol) with rapid stirring. The mixture was stirred for 15 minutes and then an additional 0.35 g of the 20 weight percent coupling agent solution was added with continued stirring. The amount of added coupling agent covered approximately 37.5 percent of the silica particle surface. Finally, the mixture was diluted with an additional 8.25 grams of methanol to give an approximately 10 weight percent solids mixture of the colloidal silica treated with the coupling agent.

To prime the polyester sheets, which are commercially available from 3M Company (Saint Paul, Minn.) under the trade designation ScotchPar with a thickness of 4 mils, the 10 weight percent solids mixture was diluted to 2 weight percent solids with additional methanol. This diluted mixture was coated onto the polyester sheets with a #4 Mayer rod and the coatings were cured in an oven at 110° C. for 2 hours.

Coatings were prepared by over-coating the primed polyester sheets with the solutions prepared in Examples 1 to 6 and comparative Examples 1 to 2 using a # 4 Mayer rod. The coatings were cured in a forced air oven at 110° C. for 20 hours.

Testing of Film Samples for Antimicrobial Activity

The following test protocol, adapted from JIS Z2801 (Japanese Industrial Standard—Test for Antimicrobial Activity), was used to assess antimicrobial properties of coated samples prepared above. Approximately 4 cm×4 cm squares of test material were wiped with isopropanol or 70% ethanol and placed into sterile Petri dishes. Duplicate test samples were each inoculated with 0.4 mL of challenge organisms (*Staphlyococcus aureus* ATCC #6538 or *Pseudomonas aeruginosa* ATCC#9027) diluted 1:5000 from overnight cultures into 0.2% tryptic soy broth (TSB) obtained from Becton, Dickinson and Co. (Sparks, Md.). 2 cm×2 cm squares of polyester film were then placed onto the inoculum. A control sample (polyester film) that was similarly inoculated was harvested immediately as described below to establish the inoculum level (t=0).

The test samples were then incubated 18 to 24 hours at 37° C. in 80 percent relative humidity or higher. After incubation, samples were removed from the Petri dishes and each transferred into 10 mL sterile Difco Dey Engley Neutralizing Broth (NB) obtained from Becton, Dickinson and Co. The neutralizing broth was used to neutralize the antimicrobials so that would not interfere with counting the remaining live bacterial after harvesting. The tubes containing the NB and test material were placed into an ultrasonic bath for 60 seconds then mixed for 60 seconds to release the bacteria from the materials into the NB. Viable bacteria were then enumerated by diluting the NB with phosphate-buffered saline (PBS). The PBS contained $KH_2PO_4$ (0.24 grams), $Na_2HPO_4$ (1.44 grams), NaCl (8 grams), and KCl (0.2 grams) per liter with the pH adjusted to 7.2. The solution was plated onto TSB agar. The plates were incubated at 37° C. for 24 to 48 hours and then the colony forming units (CFUs) were counted. Sensitivity limit for this test method was deemed to be 100 CFU/sample. The results of the JIS Z2801 tests for antimicrobial activity are summarized in Table 1. The values indicate log reduction versus the control (t=0).

TABLE 1

| Sample | S. aureus | P. aeruginosa |
|---|---|---|
| Primer coat only | −0.1 | 0.1 |
| Example 1 | >3.9 | >4.3 |
| Example 2 | >3.9 | >4.3 |
| Example 3 | 1.5 | 1.4 |
| Example 4 | −0.2 | 0.3 |
| Comparative Ex. 1 | −0.2 | 0.5 |
| Comparative Ex. 2 | 0.4 | 1.1 |
| Example 5 | >3.6 | >4.8 |
| Example 6 | >3.6 | >4.8 |

Table 1 was calculated by taking the log of the quotient of the time-zero CFU/sample count by the final CFU/sample count. A ">" symbol indicates that there were no detectable CFU recovered from the test sample and the calculation is based on the test limit of detection (100 CFU per sample).

The rate-of-kill was tested using the same protocol as outlined in the JIS Z2801 protocol, but harvesting was conducted after 10, 30, 40 and 90 minutes. Table 2 depicts the log reduction versus the control (t=0) of S. aureus colony forming units (CFU) after the specified amount of time for coatings of Examples 1 and 5.

TABLE 2

| Time (min) | Example 1 | Example 5 |
|---|---|---|
| 10 | 1.1 | 0.9 |
| 20 | >3.8 | 2.8 |
| 40 | >3.8 | 3.4 |
| 90 | >3.8 | 3.7 |

The data in Table 2 was calculated by taking the log of the quotient of the time-zero CFU/sample count by the final CFU/sample count. A ">" symbol indicates that there were no detectable CFU recovered from the test sample and the calculation is based on the test limit of detection (100 CFU per sample).

Resistance to Biofilm Formation

Polycarbonate coupons obtained from Biosurface Technologies (Bozeman, Mont.) with a 0.5-inch diameter were first cleaned with toluene, followed by ethanol and water using a TEX WIPE 304 cloth obtained from ITW Texwipe (South Mahwah, N.J.). The priming composition, which is described above and which contains NALCO 1030 treated with a coupling agent, was applied to the each face of the polycarbonate coupons. A liquid bead of the primer compositions (10 μL of the 2 weight percent solids dispersion) was placed on each face of the coupon. The primer composition was spread over the surface by rolling a glass rod over each liquid bead. The primer was allowed to air dry and then cured for 2 hours at 110° C. A sample (10 μL) of a coating solution containing the polymeric material with multiple pendant groups (5 weight percent solution as prepared in the various Examples) was allowed to wet and spread on each face of the coupon. The coating was air dried and then cured at 110° C. for 20 hours.

The CDC biofilm reactor (Biosurface Technologies) was used to evaluate the ability of the prepared polymeric materials with multiple pendant groups to resist biofilm formation. This system allowed quantification of biofilm formation on multiple test substrate samples (coupons) in tandem. The coupons were mounted in the reactor with three replicates of each coating per holder. There were eight holders per reactor. Samples were washed in the assembled reactor by passing water through the reactor for 16 to 24 hours prior to starting the experiment. The assembled reactor was then autoclaved (15 minutes at 121° C.) followed by filling with approximately 350 mL growth medium from a reservoir containing 10 liters of sterile 2 weight percent TSB in micro-filtered, deionized water. The reactor was then inoculated with 0.4 mL of a 5 mL overnight culture of Staphylococcus epidermidis ATCC #35984 in TSB. The reactor culture was incubated for 24 hours with stirring (130 RPM) without flow of growth medium from the reservoir to allow attachment and growth of cells. Fresh growth medium from the reservoir was then passed through the reactor at rate of approximately 400 mL per hour for an additional 24 hours to facilitate biofilm growth, also with stirring (130 RPM). All incubations were at 37° C.

After incubation, the rods, intact coupon samples and adherent biofilm were removed from the CDC reactor. Biofilm was manually removed from the coupon test surfaces by scraping with a wooden applicator stick which was rinsed into sterile PBS. This process was repeated for both sides of each coupon until no visible biofilm remained. Cells from the biofilm cultures were dispersed by using a Branson Digital Sonifier 250 (40% power output, 10 sec pulse) obtained from Branson Ultrasonics Corp. (Danbury, Conn.) and the dispersed cells diluted and plated onto TSB agar. Colonies were counted after incubating at 37° C. for 48 hours.

Table 3 indicates the amount of biofilm formed by Staphylococcus epidermidis on surfaces treated with material Examples 1 and 2 as compared to untreated polycarbonate coupon controls measured using the CDC reactor protocol as described above. S. epidermidis, an opportunistic pathogen, is a frequent colonizer of indwelling medical devices.

TABLE 3

| Sample | Biofilm formed versus control |
|---|---|
| Example 1 | 7% |
| Example 2 | 2% |

We claim:
1. A polymeric material comprising:
(a) at least one divalent unit of Formula (I) or a salt thereof;

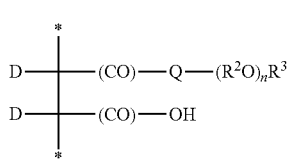

(I)

(b) at least one divalent unit of Formula (II) or a salt thereof; and

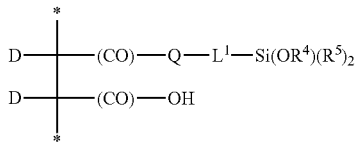
(II)

(c) at least one divalent unit of Formula (III) or salt thereof;

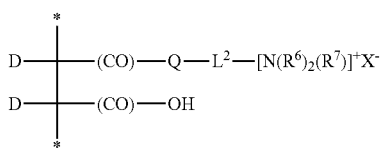
(III)

wherein
each D is independently hydrogen or an alkyl;
each Q is independently oxy or —NR$^1$—where R$^1$ is selected from a hydrogen, alkyl, aryl, or aralkyl;
each R$^2$ is independently an alkylene;
R$^3$ is an alkyl;
R$^4$ is hydrogen, an alkyl, or a part of a silicone;
each R$^5$ is independently an hydroxyl, alkyl, perfluoroalkyl, aryl, aralkyl, alkoxy, or part of a silicone;
each R$^6$ is independently an alkyl, aryl, or aralkyl;
R$^7$ is an alkyl;
L$^1$ is a first linking group comprising an alkylene or heteroalkylene;
L$^2$ is a second linking group comprising an alkylene or heteroalkylene;
n is an integer greater than 1; and
X$^-$ is an anion.

2. The polymeric material of claim 1, wherein the polymeric material further comprises
(d) at least one divalent group of Formula (IVa), Formula (IVb), or a salt thereof

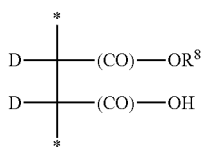
(IVa)

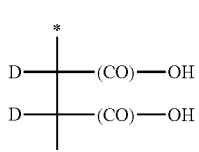
(IVb)

wherein
R$^8$ is an alkyl.

3. The polymeric material of claim 2, wherein R$^8$ is an alkyl having 1 to 10 carbon atoms.

4. A method of preparing a polymeric material, the method comprising:
providing a solution comprising a copolymer polymeric precursor having a plurality of anhydride groups;
forming a poly(alkylene oxide)-containing pendant group by reacting at least one of the anhydride groups with a poly(alkylene oxide) having a single nucleophilic group selected from a primary amino group, secondary amino group, or hydroxyl group, wherein the poly(alkylene oxide)-containing pendant group is of Formula (I) or a salt thereof;

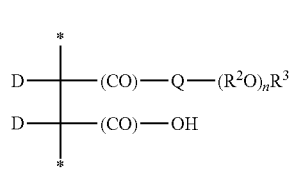
(I)

forming a silicon-containing pendant group by reacting at least one of the anhydride groups with a silane having a first functional group selected from a primary amino group, a secondary amino group, or a hydroxyl group plus a second functional group that is a silicon-containing group, wherein the silicon-containing pendant group is of Formula (II) or a salt thereof; and

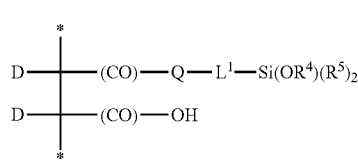
(II)

forming a tertiary amino-containing pendant group by reacting at least one of the anhydride groups, wherein the amine has a first functional group selected from a primary amino group, a secondary amino group, or a hydroxyl group plus a second functional group that is a tertiary amino group;
alkylating the tertiary amino-containing pendant group with an alkylating agent to form a quaternary amino-containing pendant group, wherein the tertiary amino-containing pendant group is of Formula (III) or salt thereof,

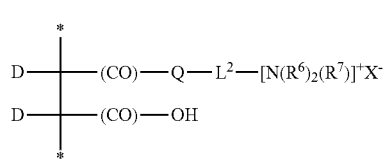
(III)

wherein
each D is independently hydrogen or an alkyl;
each Q is independently oxy or —NR$^1$—where R$^1$ is selected from a hydrogen, alkyl, aryl, or aralkyl;
each R$^2$ is independently an alkylene;
R$^3$ is an alkyl;
R$^4$ is hydrogen, an alkyl, or a part of a silicone;

each $R^5$ is independently an hydroxyl, alkyl, perfluoroalkyl, aryl, aralkyl, alkoxy, or part of a silicone;
each $R^6$ is independently an alkyl, aryl, or aralkyl;
$R^7$ is an alkyl;
$L^1$ is a first linking group comprising an alkylene or heteroalkylene;
$L^2$ is a second linking group comprising an alkylene or heteroalkylene;
n is an integer greater than 1; and
$X^-$ is an anion.

5. The method of claim 4, further comprising forming an alkoxycarbonyl-containing pendant group by reacting at least one of the anhydride groups with an alcohol.

6. The method of claim 5, wherein the alcohol has 1 to 6 carbon atoms.

7. The method of claim 4, further comprising coating the polymeric material on a substrate to form a coating layer.

8. An article comprising:
a substrate; and
a coating adjacent to the substrate, the coating comprising a polymeric material comprising:
(a) at least one divalent unit of Formula (I) or a salt thereof;

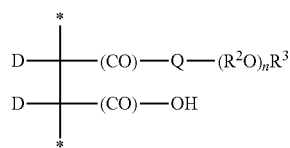

(b) at least one divalent unit of Formula (II) or a salt thereof; and

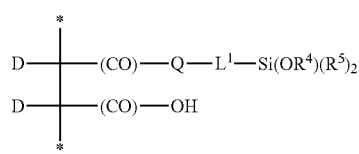

(c) at least one divalent unit of Formula (III) or salt thereof;

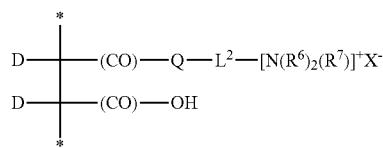

wherein
each D is independently hydrogen or an alkyl;
each Q is independently oxy or —$NR^1$—where $R^1$ is selected from a hydrogen, alkyl, aryl, or aralkyl;
each $R^2$ is independently an alkylene;
$R^3$ is an alkyl;
$R^4$ is hydrogen, an alkyl, or a part of a silicone;
each $R^5$ is independently an hydroxyl, alkyl, perfluoroalkyl, aryl, aralkyl, alkoxy, or part of a silicone;
each $R^6$ is independently an alkyl, aryl, or aralkyl;
$R^7$ is an alkyl;
$L^1$ is a first linking group comprising an alkylene or heteroalkylene;
$L^2$ is a second linking group comprising an alkylene or heteroalkylene;
n is an integer greater than 1; and
$X^-$ is an anion.

9. A method of preparing an antimicrobial surface, an antifouling surface, or both, the method comprising:
providing a substrate; and
applying a coating to a surface of the substrate, the coating comprising a polymeric material comprising
(a) at least one divalent unit of Formula (I) or a salt thereof;

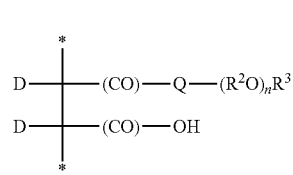

(b) at least one divalent unit of Formula (II) or a salt thereof; and

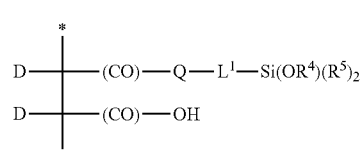

(c) at least one divalent unit of Formula (III) or salt thereof;

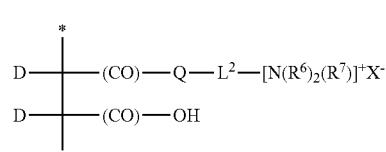

wherein
each D is independently hydrogen or an alkyl;
each Q is independently oxy or —$NR^1$—where $R^1$ is selected from a hydrogen, alkyl, aryl, or aralkyl;
each $R^2$ is independently an alkylene;
$R^3$ is an alkyl;
$R^4$ is hydrogen, an alkyl, or a part of a silicone;
each $R^5$ is independently an hydroxyl, alkyl, perfluoroalkyl, aryl, aralkyl, alkoxy, or part of a silicone;
each $R^6$ is independently an alkyl, aryl, or aralkyl;
$R^7$ is an alkyl;
$L^1$ is a first linking group comprising an alkylene or heteroalkylene;
$L^2$ is a second linking group comprising an alkylene or heteroalkylene;
n is an integer greater than 1; and
$X^-$ is an anion.

10. A compositions comprising:
a liquid comprising water, an organic solvent, or a mixture thereof;

a polymeric material dissolved in the liquid, the polymeric material comprising (a) at least one divalent unit of Formula (I) or a salt thereof;

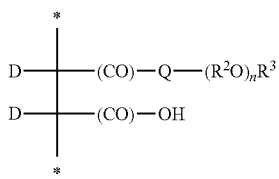

(I)

(b) at least one divalent unit of Formula (II) or a salt thereof; and

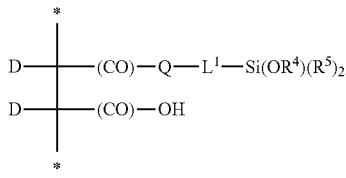

(II)

(c) at least one divalent unit of Formula (III) or salt thereof;

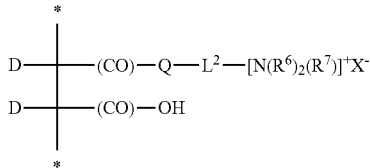

(III)

wherein each D is independently hydrogen or an alkyl;

each Q is independently oxy or —$NR^1$— where $R^1$ is selected from a hydrogen, alkyl, aryl, or aralkyl;

each $R^2$ is independently an alkylene;

$R^3$ is an alkyl;

$R^4$ is hydrogen, an alkyl, or a part of a silicone;

each $R^5$ is independently an hydroxyl, alkyl, perfluoroalkyl, aryl, aralkyl, alkoxy, or part of a silicone;

each $R^6$ is independently an alkyl, aryl, or aralkyl;

$R^7$ is an alkyl;

$L^1$ is a first linking group comprising an alkylene or heteroalkylene;

$L^2$ is a second linking group comprising an alkylene or heteroalkylene;

n is an integer greater than 1; and $X^-$ is an anion.

11. The polymeric material of claim 1, wherein $R^6$ is an alkyl having 1 to 3 carbon atoms and $R^7$ is an alkyl having 10 to 20 carbon atoms.

12. The article of claim 8, wherein $R^6$ is an alkyl having 1 to 3 carbon atoms and $R^7$ is an alkyl having 10 to 20 carbon atoms.

13. The composition of claim 10, wherein $R^6$ is an alkyl having 1 to 3 carbon atoms and $R^7$ is an alkyl having 10 to 20 carbon atoms.

14. The method of claim 9, wherein $R^6$ is an alkyl having 1 to 3 carbon atoms and $R^7$ is an alkyl having 10 to 20 carbon atoms.

* * * * *

UNITED STATES PATENT AND TRADEMARK OFFICE
CERTIFICATE OF CORRECTION

PATENT NO. : 8,420,069 B2
APPLICATION NO. : 13/120293
DATED : April 16, 2013
INVENTOR(S) : John J Stofko et al.

It is certified that error appears in the above-identified patent and that said Letters Patent is hereby corrected as shown below:

Title Page, Column 1 (Inventors)
Line 2, delete "Mablewood," and insert -- Maplewood, --, therefor.

In the Specifications:

Column 2
Line 56, delete "perfluoralkyl" and insert -- perfluoroalkyl --, therefor.

Column 4
Line 15, delete "perfluoralkyl" and insert -- perfluoroalkyl --, therefor.

Column 7
Line 32, after "thereof" insert -- . --.

Column 8
Line 1, after "thereof" insert -- . --.

Line 21, after "thereof" insert -- . --.

Column 13
Line 20, delete "$L^1$" and insert -- $L^1$ --, therefor.

Column 14
Lines 52-53, delete "N diethylaminopropylamine" and insert -- N-diethylaminopropylamine --, therefor.

Line 53, delete "N dipropylaminoethanol" and insert -- N-dipropylaminoethanol --, therefor.

Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 8,420,069 B2

Lines 53-54, delete "N dimethylaminobutylamine." and insert -- N-dimethylaminobutylamine. --, therefor.

Column 17
Line 13, after "thereof" insert -- ; --.

Column 18
Lines 60-61, delete "Si(OR$^c$)(R$^d$)2" and insert -- Si(OR$^c$)(R$^d$)$_2$ --, therefor.

Line 62, delete "perfluoralkyl" and insert -- perfluoroalkyl --, therefor.

Line 65, delete "Si(OR$^e$)(R$^f$)2" and insert -- Si(OR$^e$)(R$^f$)$_2$ --, therefor.

Column 20
Line 64, after "time" insert -- . --.

Column 21
Line 43 (Approx.), delete "Aminopropyltriethyloxysilane" and insert -- Aminopropyltriethoxysilane --, therefor.

Line 47 (Approx.), delete "Dodecylbromine" and insert -- Dodecylbromide --, therefor.

Column 23
Line 60, delete "aminopropylimazole" and insert -- aminopropylimidazole --, therefor.

Column 24
Lines 49-50, delete "Staphlyococcus" and insert -- Staphylococcus --, therefor.

Column 25
Line 3, delete "KH$_2$PO4" and insert -- KH$_2$PO$_4$ --, therefor.